(12) United States Patent
Morin et al.

(10) Patent No.: US 10,406,698 B2
(45) Date of Patent: Sep. 10, 2019

(54) APPARATUS, SYSTEMS, AND METHODS FOR MODULAR SOFT ROBOTS

(71) Applicant: President and Fellows of Harvard College, Cambridge, MA (US)

(72) Inventors: Stephen A. Morin, Lincoln, NE (US); Sen Wai Kwok, Watertown, MA (US); Robert F. Shepherd, Brooktondale, NY (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 753 days.

(21) Appl. No.: 14/421,429

(22) PCT Filed: Jul. 18, 2013

(86) PCT No.: PCT/US2013/051092
§ 371 (c)(1),
(2) Date: Feb. 12, 2015

(87) PCT Pub. No.: WO2014/015146
PCT Pub. Date: Jan. 23, 2014

(65) Prior Publication Data
US 2015/0217459 A1    Aug. 6, 2015

Related U.S. Application Data

(60) Provisional application No. 61/673,068, filed on Jul. 18, 2012.

(51) Int. Cl.
*B25J 18/06*    (2006.01)

(52) U.S. Cl.
CPC ......... *B25J 18/06* (2013.01); *Y10T 74/20305* (2015.01)

(58) Field of Classification Search
CPC .......... B25J 9/142; B25J 18/06; F15B 15/103; Y10T 74/20305
See application file for complete search history.

(56) References Cited

U.S. PATENT DOCUMENTS 3,343,864 A * 9/1967 Baer .................... B25J 15/0009
                                                   294/119.3
4,661,039 A * 4/1987 Brenholt .................. B25J 9/142
                                                   414/735

(Continued)

FOREIGN PATENT DOCUMENTS

EP         1319845 A2    6/2003
WO      WO-9726039 A1    7/1997

(Continued)

OTHER PUBLICATIONS

Cheney et al., "Unshackling Evolution: Evolving Soft Robots with MultipleMaterials and a Powerful Generative Encoding," Proceedings of the15th annual conference on Genetic and evolutionary computation, ACM, Amsterdam, Netherlands, Jul. 6-10, 2013, 8 pages.

(Continued)

*Primary Examiner* — Victor L MacArthur
(74) *Attorney, Agent, or Firm* — Wilmer Cutler Pickering Hale and Dorr LLP

(57) ABSTRACT

Apparatus, systems, and methods for providing modular soft robots are disclosed. In particular, the disclosed modular soft robot can include a flexible actuator having a plurality of molded flexible units. Each molded flexible unit can include a mechanical connector configured to provide a physical coupling to another molded flexible unit, and the plurality of molded flexible units are arranged to form an embedded fluidic channel. The modular soft robot can also include an inlet coupled to the embedded fluidic channel, where the inlet is configured to receive pressurized or depressurized (Continued)

fluid to inflate or deflate a portion of the flexible actuator, thereby causing an actuation of the flexible actuator.

23 Claims, 25 Drawing Sheets

(56) References Cited

U.S. PATENT DOCUMENTS

| | | | | |
|---|---|---|---|---|
| 5,469,756 | A * | 11/1995 | Feiten | B25J 15/12 74/490.05 |
| 5,560,151 | A * | 10/1996 | Roberts | E04B 1/3205 52/245 |
| 5,645,463 | A * | 7/1997 | Olsen | A63H 33/04 446/104 |
| 5,913,706 | A * | 6/1999 | Glickman | A63H 3/16 446/120 |
| 6,443,796 | B1 * | 9/2002 | Shackelford | A63H 33/042 273/237 |
| 6,718,766 | B2 * | 4/2004 | Seto | B25J 9/142 60/476 |
| 7,771,630 | B2 * | 8/2010 | Hartmann | B29D 11/00365 216/26 |
| 7,875,197 | B2 * | 1/2011 | Whitesides | B01L 3/5085 216/41 |
| 9,945,397 | B2 * | 4/2018 | Shepherd | F15B 13/04 |
| 2004/0243167 | A1 | 12/2004 | Tanaka et al. | |
| 2007/0123748 | A1 * | 5/2007 | Meglan | A61B 1/00149 600/104 |
| 2008/0182480 | A1 * | 7/2008 | Donahue | A63H 33/042 446/89 |
| 2011/0009847 | A1 * | 1/2011 | Levinson | A61B 5/1438 604/506 |

FOREIGN PATENT DOCUMENTS

| | | |
|---|---|---|
| WO | WO-2012/148472 A2 | 11/2012 |
| WO | WO-2013103412 A2 | 7/2013 |
| WO | WO-2013110086 A1 | 7/2013 |

OTHER PUBLICATIONS

Ellis, G., "Modern Practical Joinery", B.T. Batsford, London, UK, (1908), 612 pages.

Hiller et al., "Automatic Design and Manufacture of Soft Robots," IEEE Transactions on Robotics, vol. 28, No. 2, Apr. 2012, pp. 457-466.

Hiller et al., "Design and analysis of digital materialsfor physical 3D voxel printing," Rapid Prototyping Journal, vol. 15, pp. 137-149 (2009).

Hiller et al., "Tunable digital material propertiesfor 3D voxel printers," Rapid Prototyping Journal, vol. 16, No. 4, (2010), pp. 241-247.

International Search Report and Written Opinion dated Feb. 24, 2014, in the International Application No. PCT/US2013/051092, filed Jul. 18, 2013, 9 pages.

Morin et al., "Elastomeric Tiles for the Fabrication of Inflatable Structures," Advanced Functional Materials, vol. 24, pp. 5541-5549, (2014).

Morin et al., "Using "Click-e-Bricks" to Make 3D Elastomeric Structures," Advanced Materials, vol. 26, pp. 5991-5999, (2014).

Xia et al., "Soft Lithography," Annual Review Materials Science, vol. 28, (1998), pp. 153-184.

Zykov et al., "Self-reproducing machines," Nature, vol. 435, May 12, 2005, pp. 163-164.

European Search Report dated Feb. 27, 2018, in the European Application No. 17200466.5, 6 pages.

* cited by examiner

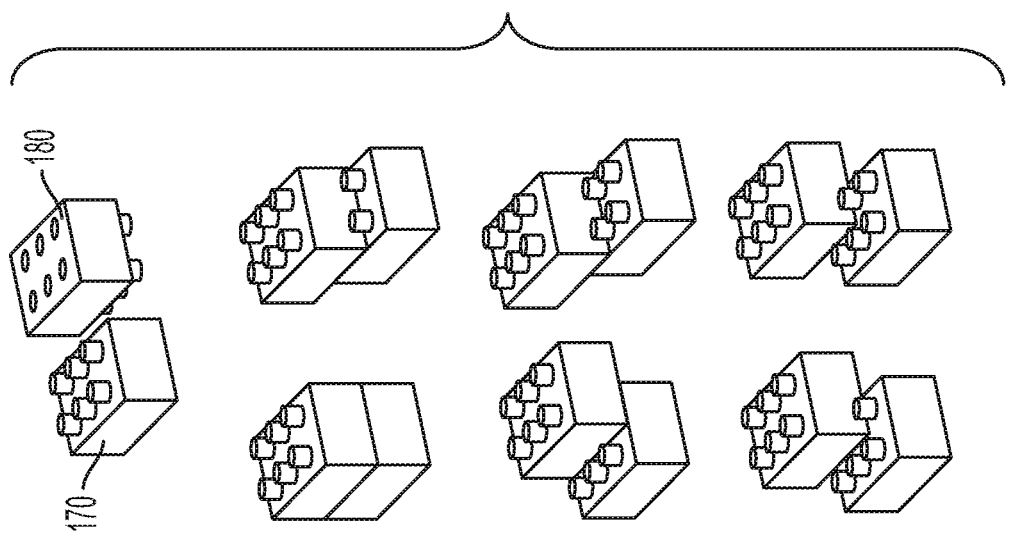
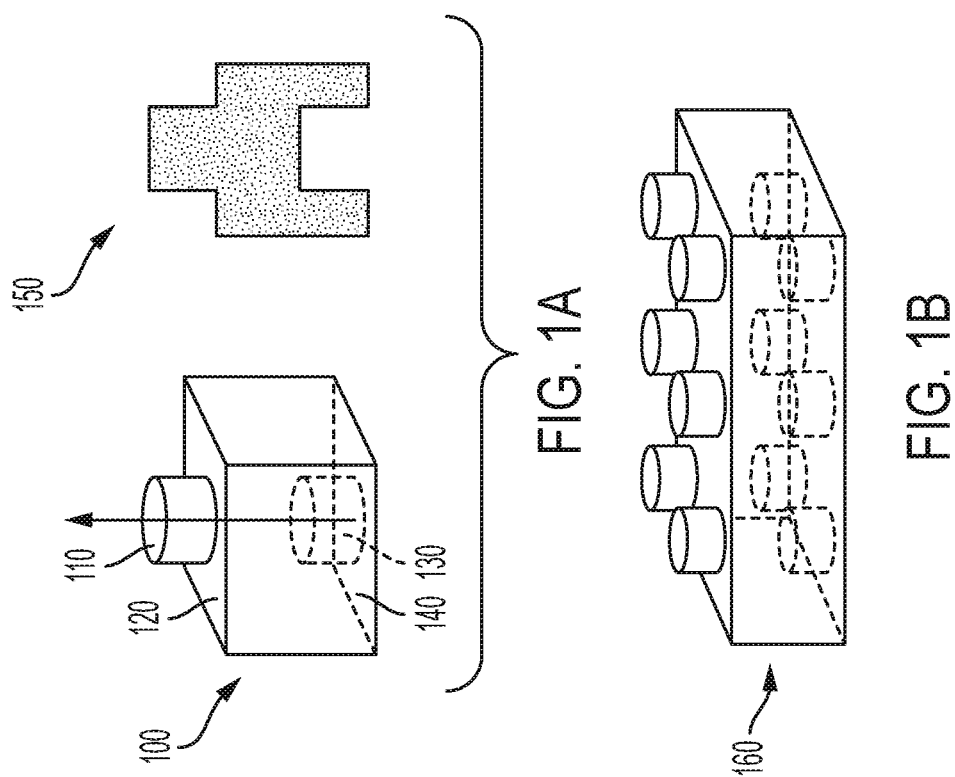
FIG. 1A
FIG. 1B
FIG. 1C

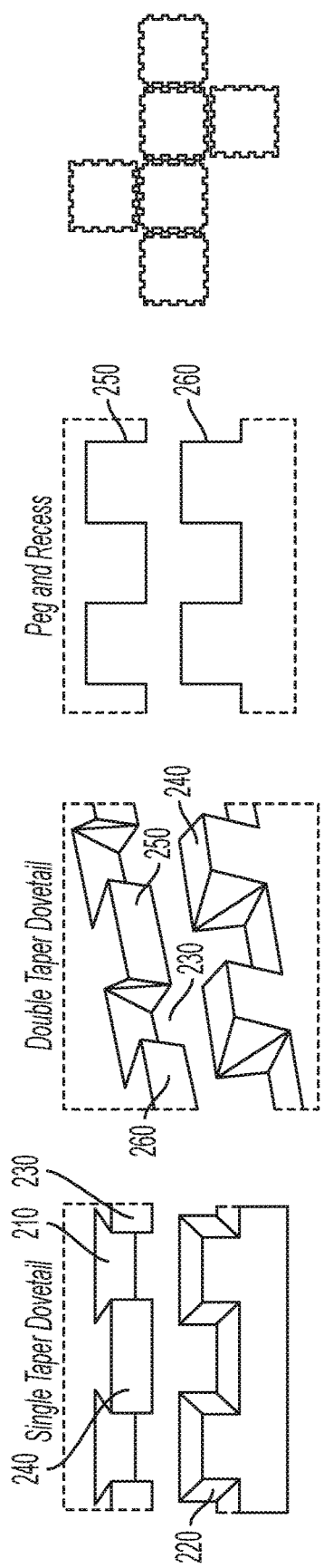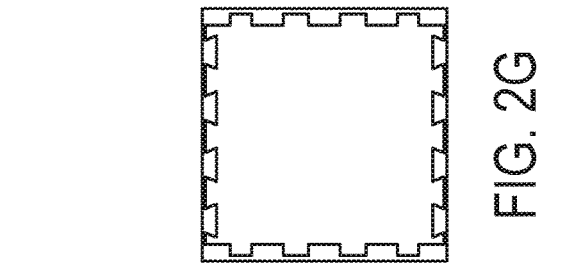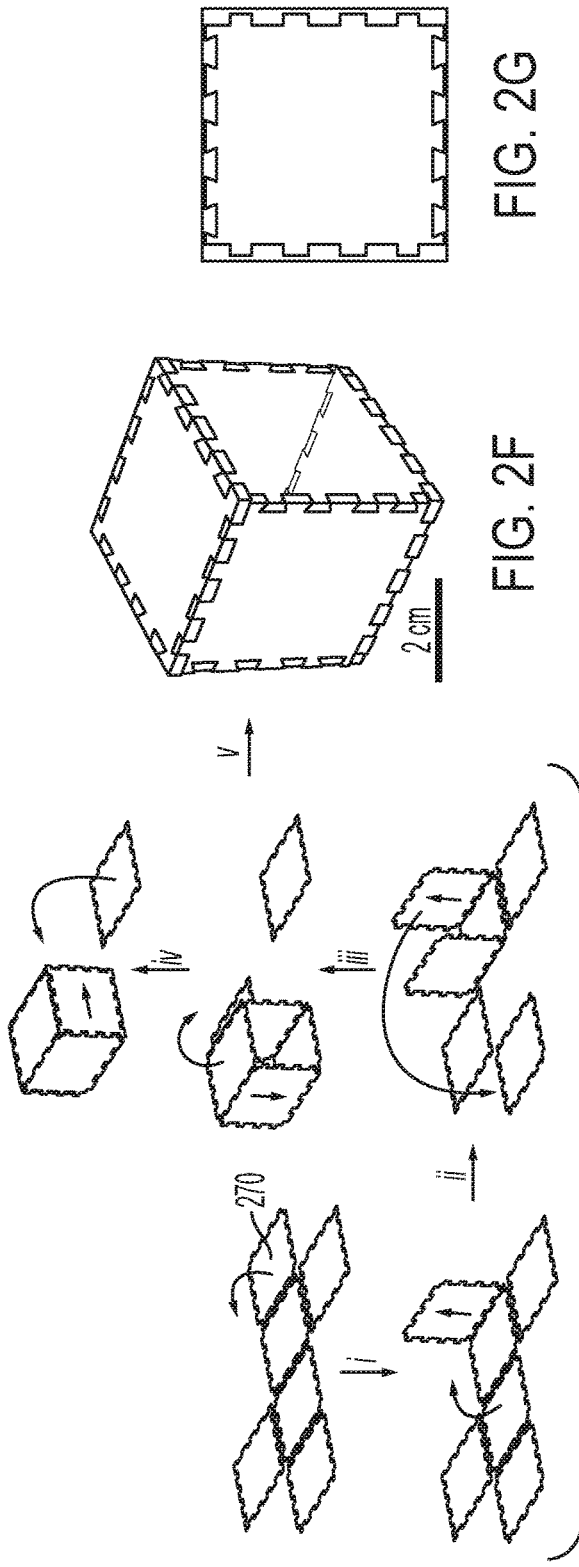

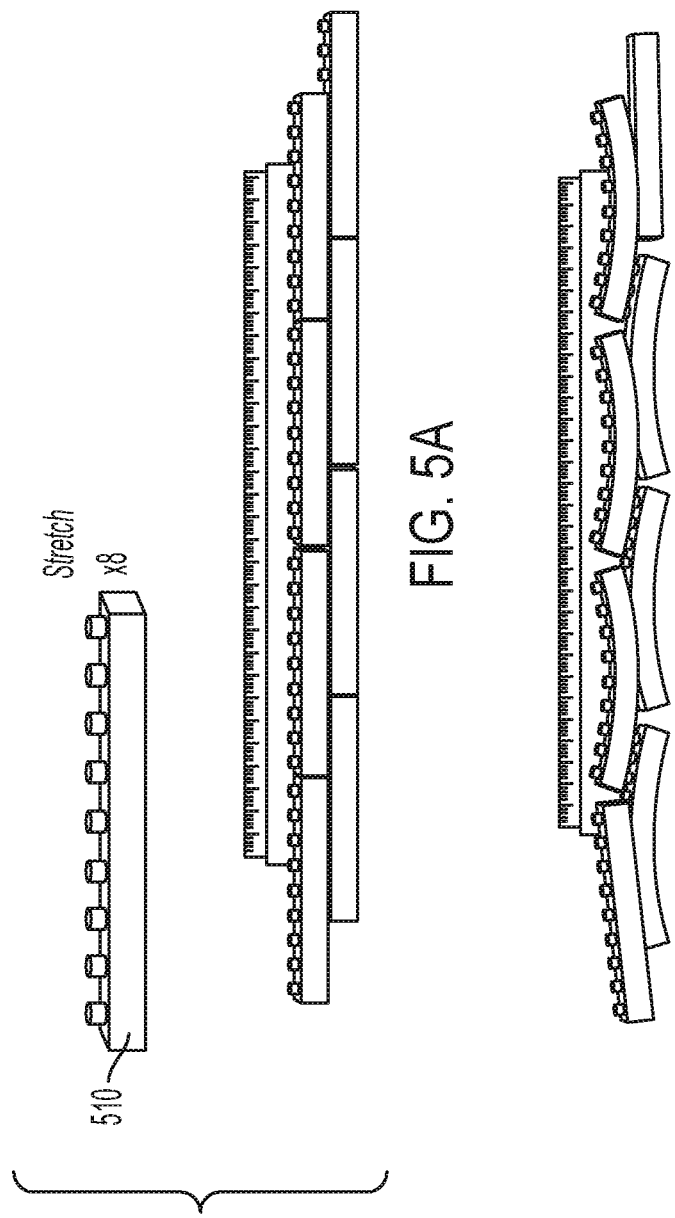

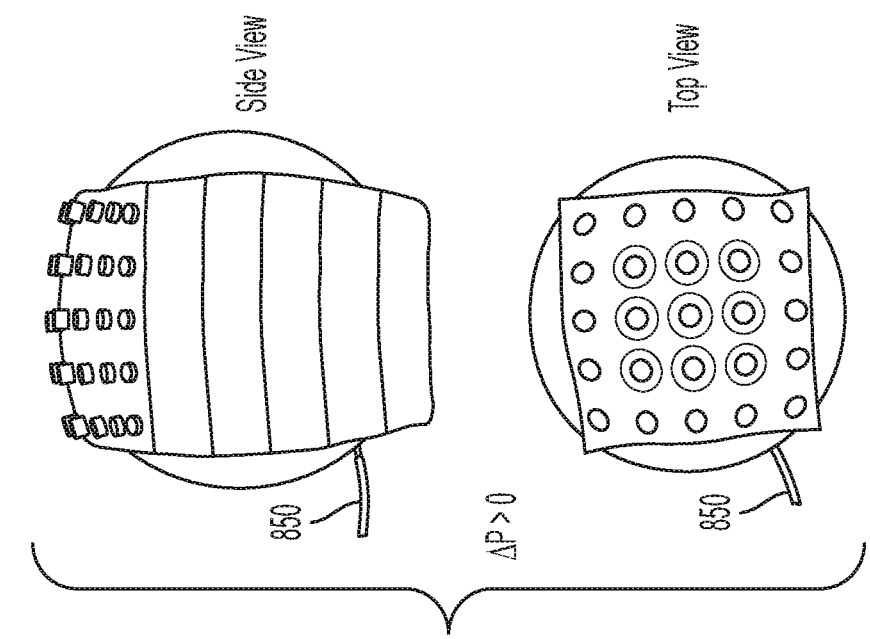
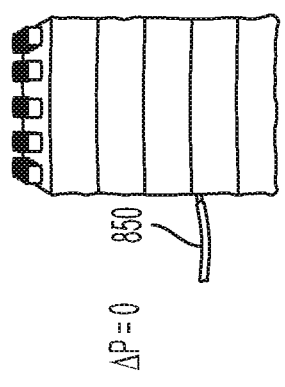
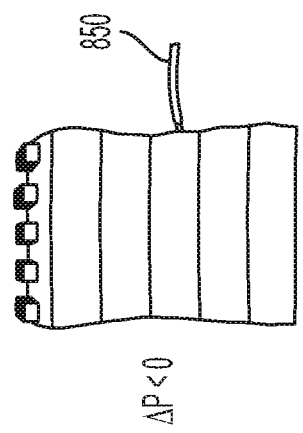
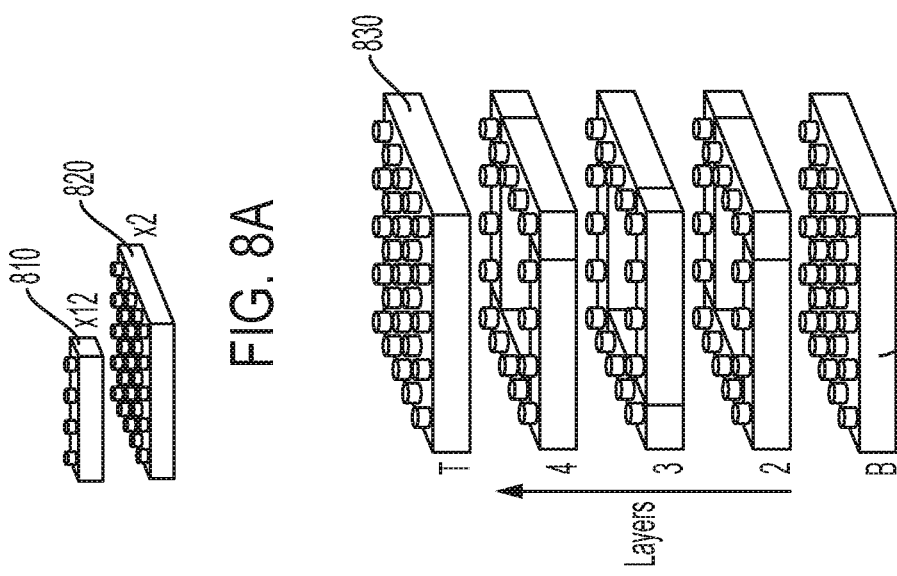

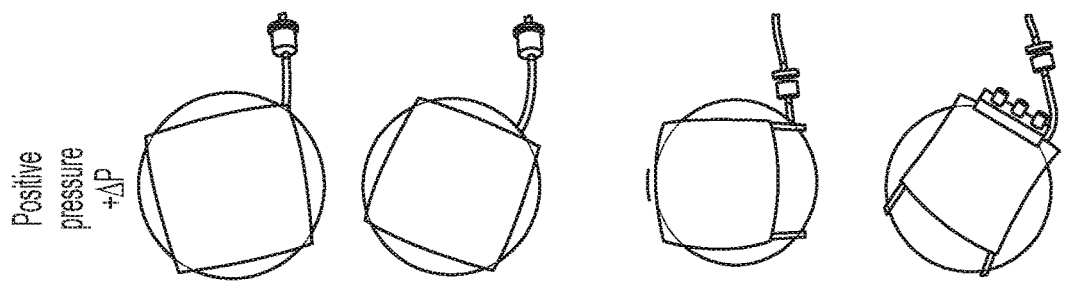
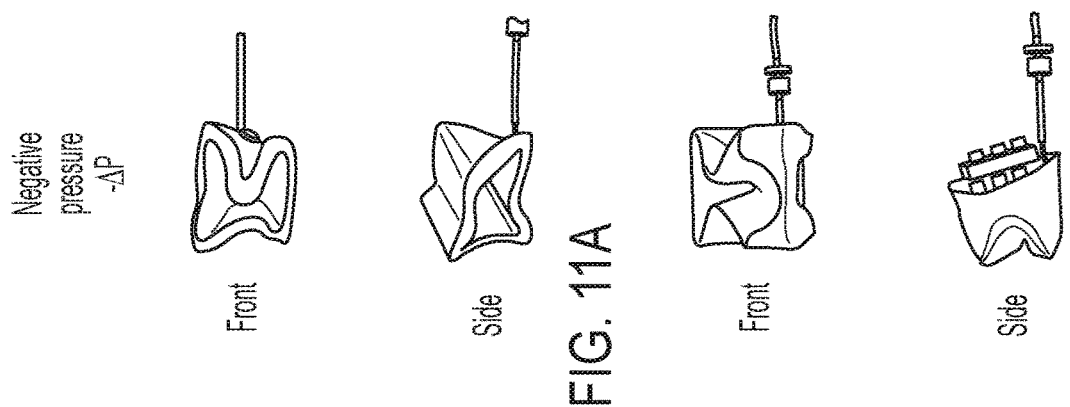
FIG. 11A
FIG. 11B

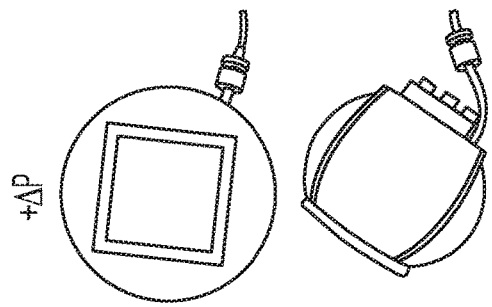
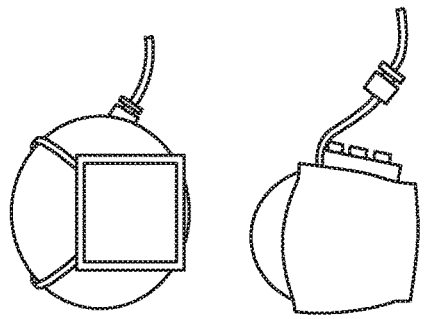
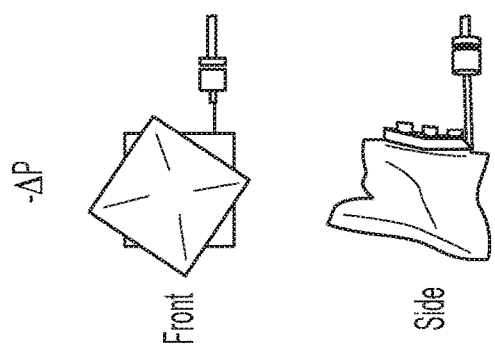
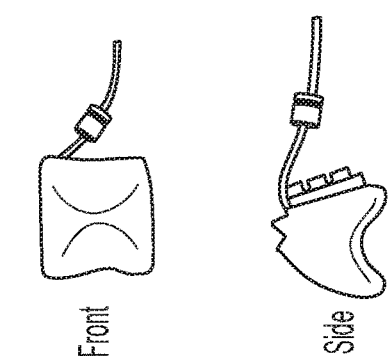
FIG. 11C
FIG. 11D
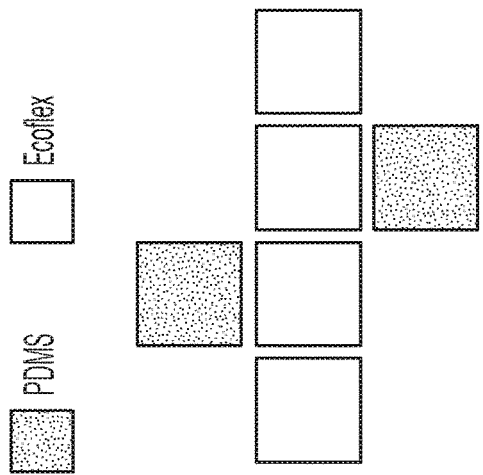
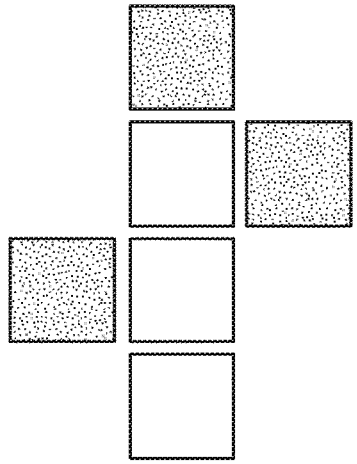

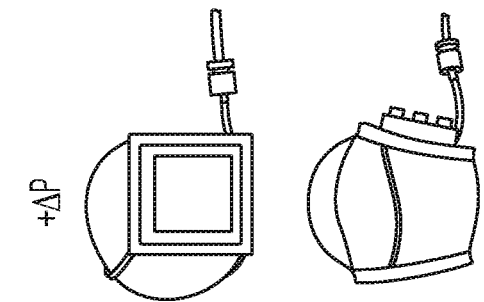
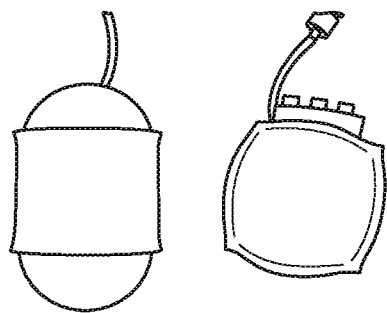
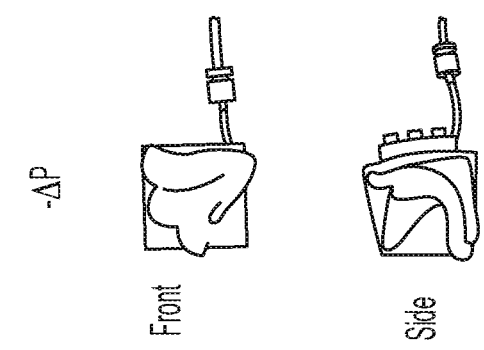
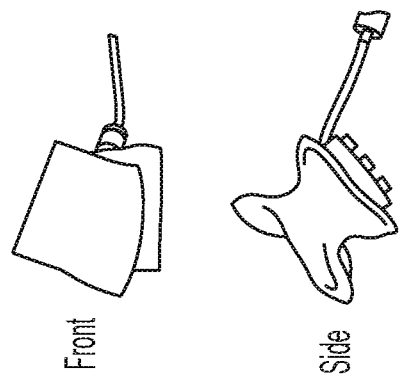
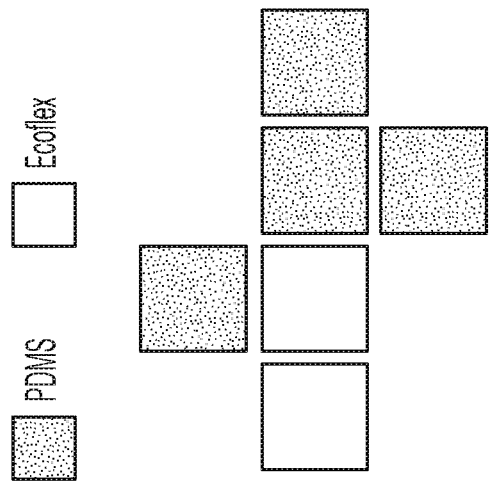
FIG. 11E
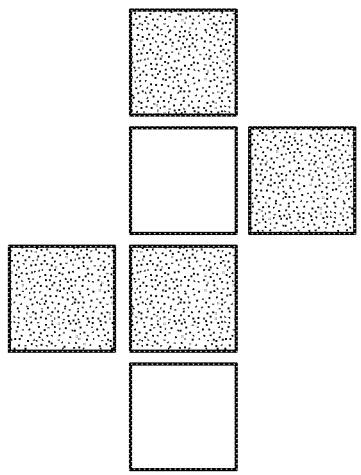
FIG. 11F

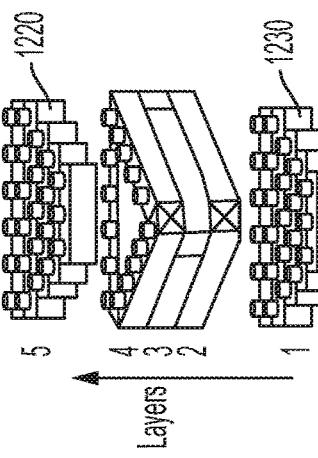
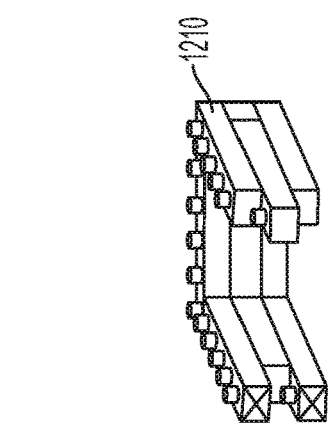
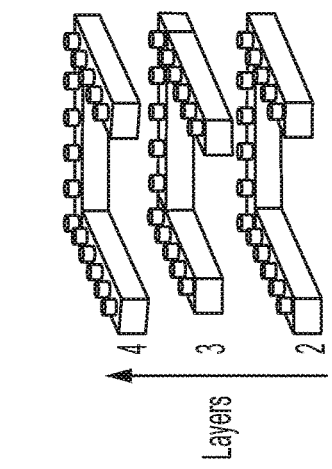
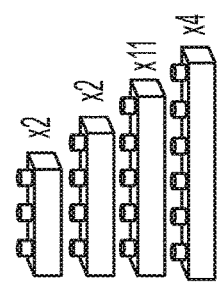
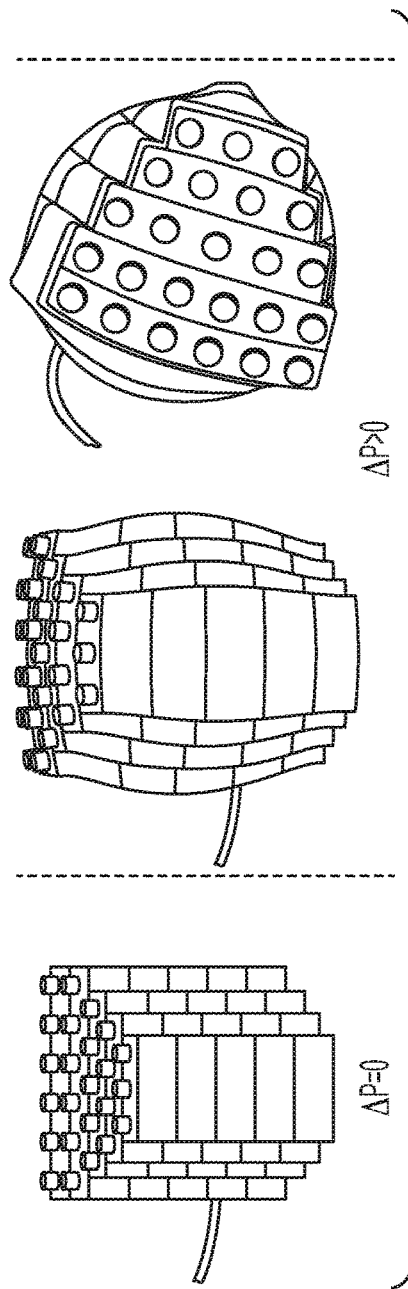
FIG. 12A
FIG. 12B
FIG. 12C
FIG. 12D
FIG. 12E

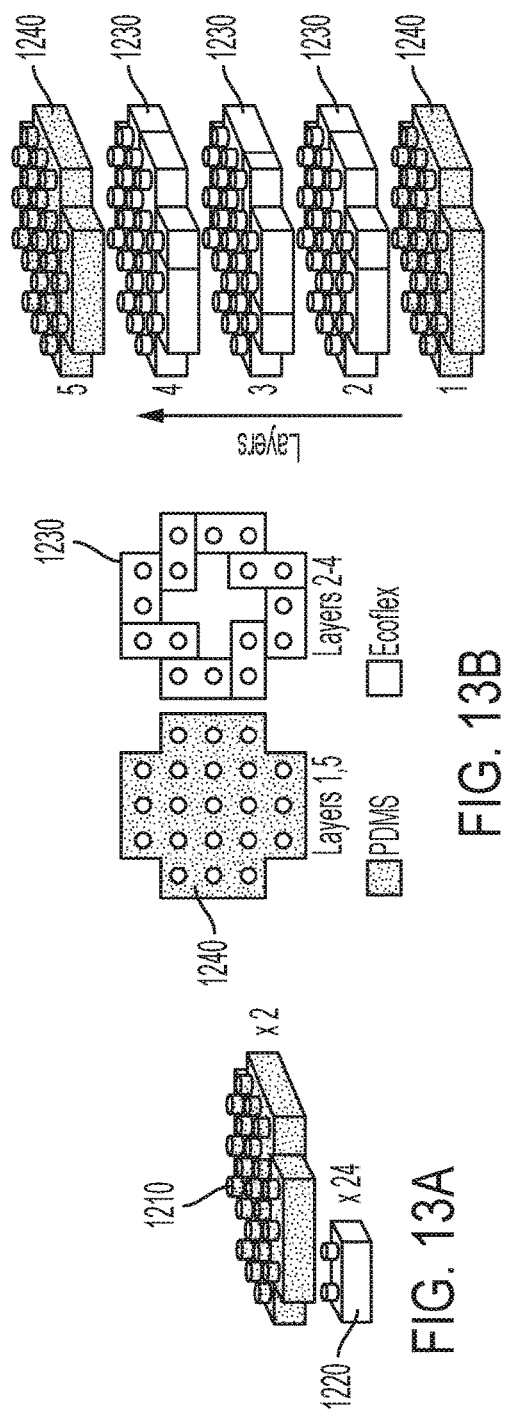
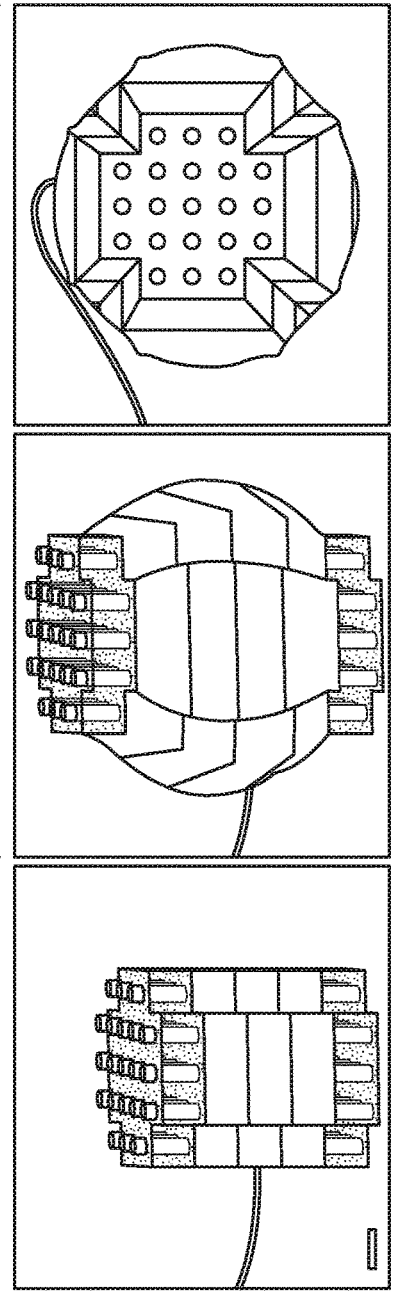
FIG. 13A
FIG. 13B
FIG. 13C
FIG. 13D

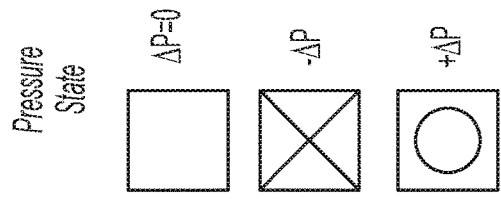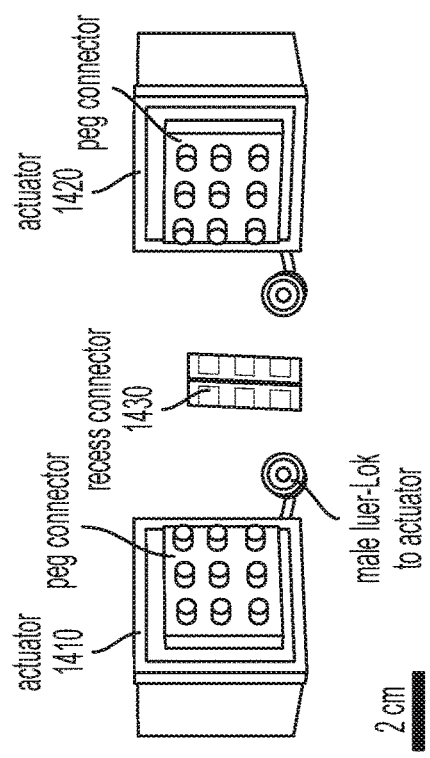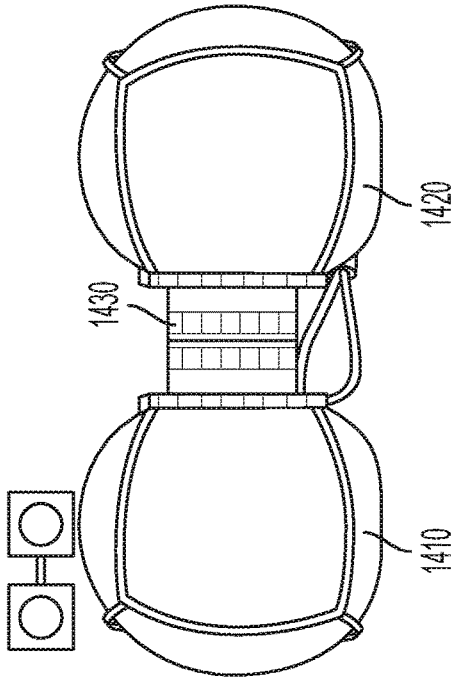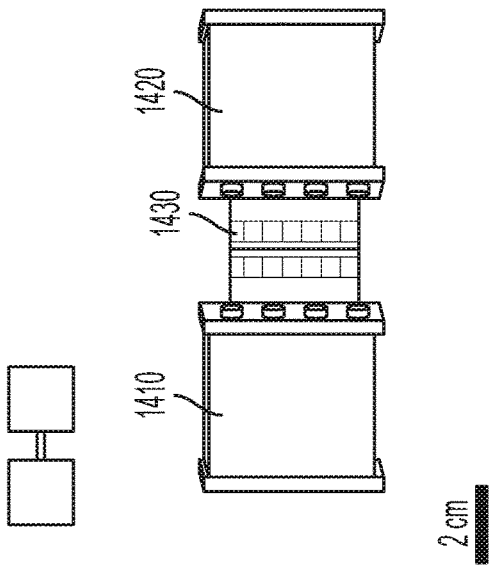
FIG. 14A
FIG. 14B
FIG. 14C

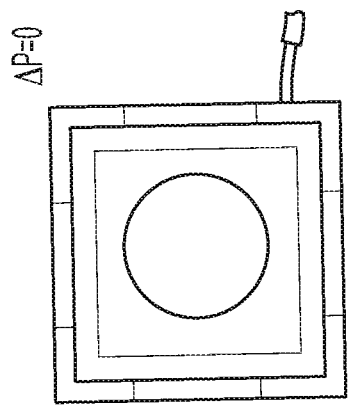
FIG. 15A
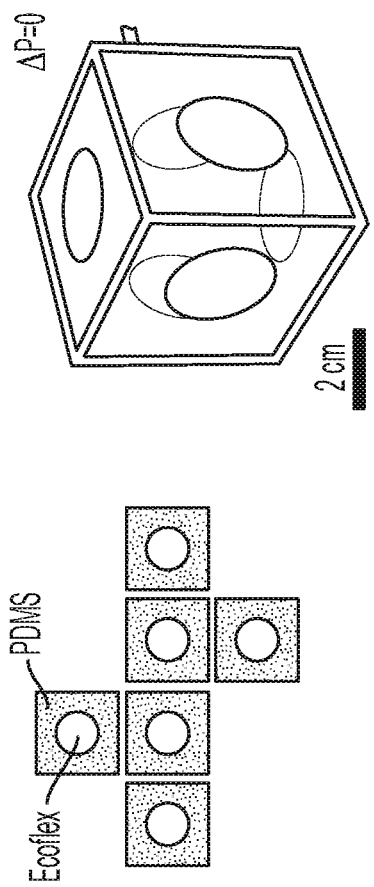
FIG. 15B
FIG. 15C
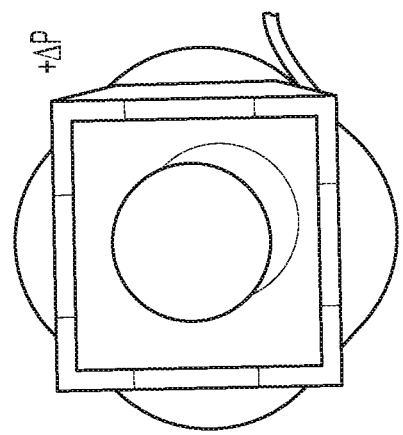
FIG. 15D
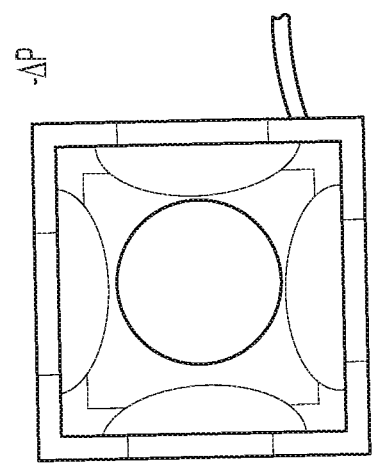
FIG. 15E

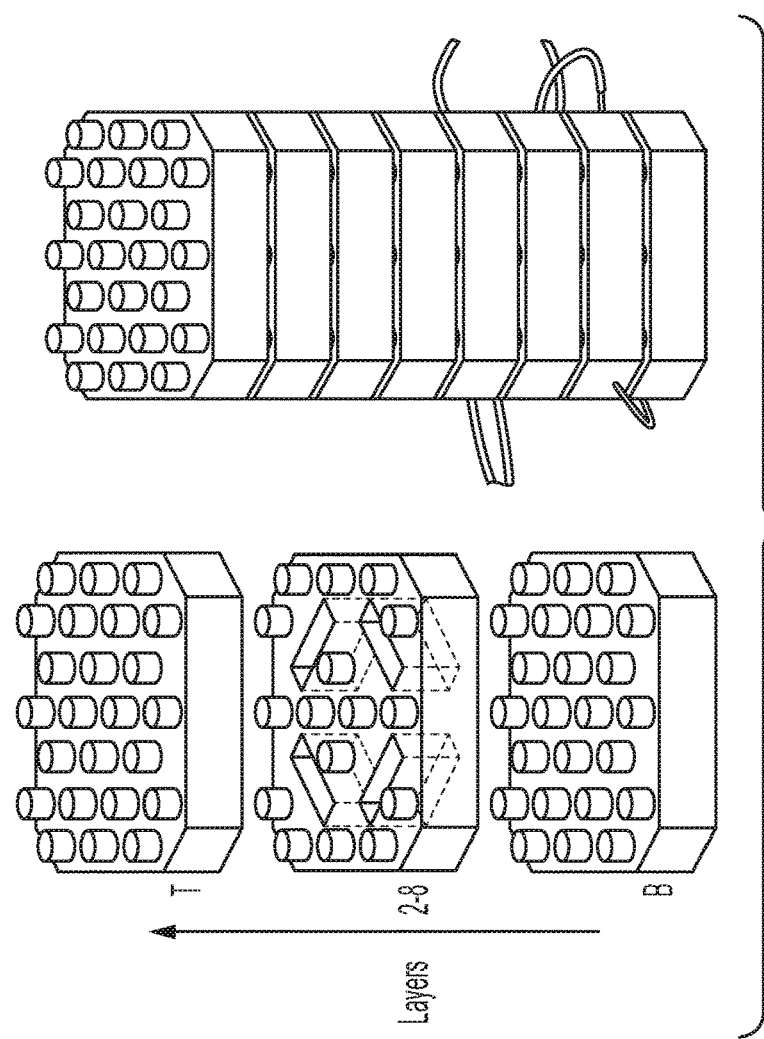
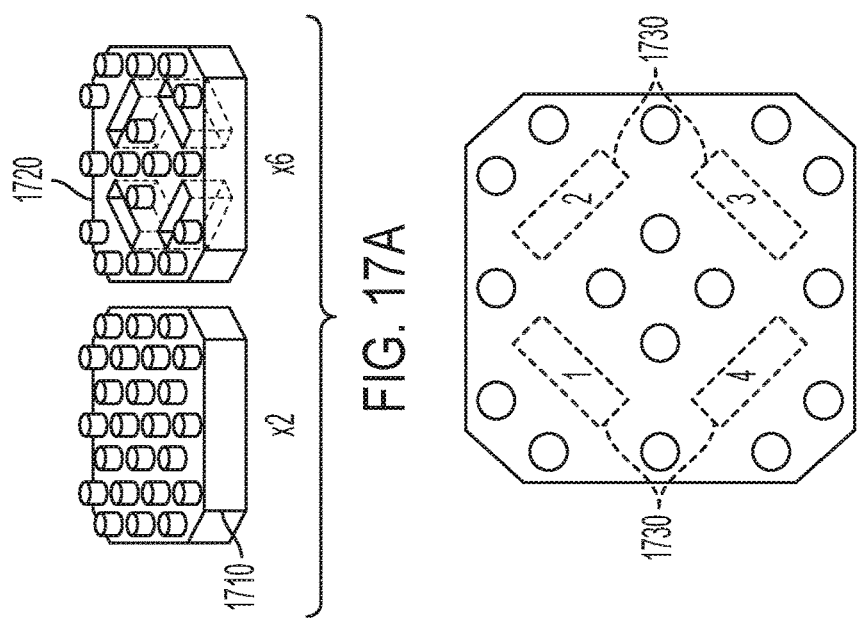
FIG. 17A
FIG. 17B
FIG. 17C

APPARATUS, SYSTEMS, AND METHODS FOR MODULAR SOFT ROBOTS

CROSS-REFERENCE TO RELATED APPLICATIONS

This application is a national phase application, submitted under 35 U.S.C. § 371, of International Application No. PCT/US2013/051092, entitled "APPARATUS, SYSTEMS, AND METHODS FOR MODULAR SOFT ROBOTS," filed on Jul. 18, 2013, which claims benefit of the earlier filing date of U.S. Provisional Patent Application No. 61/673,068, entitled "SYSTEMS AND METHODS FOR MODULAR SOFT ROBOTS," filed on Jul. 18, 2012. All patents, patent applications and publications cited herein are hereby incorporated by reference in their entireties in order to more fully describe the state of the art as known to those skilled therein as of the date of the invention described herein.

STATEMENT REGARDING FEDERALLY SPONSORED RESEARCH OR DEVELOPMENT

The present invention was made with United States government support under Grant No. W911NF-11-1-0094 awarded by Defense Advanced Research Projects Agency (DARPA). The United States government has certain rights in this invention.

BACKGROUND

Many approaches to robots that resemble animals with skeletons are being actively developed: the "Big Dog" is an example. Most of these robots are constructed using so-called "hard" body plans; that is, a rigid (usually metal) skeleton, electrical or hydraulic actuation, electromechanical control, sensing, and feedback. The hard robots are very successful at the tasks for which they were designed. For example, hard robots are useful in heavy manufacturing in controlled environments. However, these hard robots cannot operate well when faced with certain demanding tasks for which the hard robots were not designed. For example, in demanding terrains with rocks and dips, hard robots with tracks and wheels cannot travel safely.

Some of the challenges faced by the hard robots can be addressed by a second class of robot: those based on animals without skeletons. The second class of robots is much less explored, for a number of reasons: i) there is a supposition that "marine-like" organisms e.g., (squid) will not operate without the buoyant support of water; ii) the materials and components necessary to make these systems are not available; iii) the major types of actuation used in them (for example, hydrostats) are virtually unused in conventional robotics. These systems are intrinsically very different in their capabilities and potential uses than hard-bodied systems. While they will (at least early in their development) be slower than hard-bodied systems, they will also be more stable and better able to move through constrained spaces (cracks, rubble), lighter, and less expensive.

Robots, or robotic actuators, which can be described as "soft" are most easily classified by the materials used in their manufacture and their methods of actuation. For example, a soft robotic system can use soft materials, such as soft elastomer, or flexible materials, such as papers, a nylon fabrics, and a nitrile, to build its structures, as disclosed in International Patent Application No. PCT/US2011/061720, titled "Soft robotic actuators," by Ilievski et al., International Patent Application No. PCT/US2012/059226, titled "Systems and methods for actuator soft robotic actuators" by Shepherd et al., and International Patent Application No. PCT/US2013/022593, titled "Flexible robotic actuators" by Mazzeo et al., each of which is hereby incorporated by reference in its entirety.

Unfortunately, the process for building a soft robot is both challenging and time-consuming. Furthermore, the process is often tailored to a particular design envisioned in the early phase of the development, and is hard to modify at a later stage. Therefore, there is a need in the art to develop an easy and versatile technique for building soft robots.

SUMMARY

Modularized design of soft robots is described. These and other aspects and embodiments of the disclosure are illustrated and described below.

Some of the disclosed embodiments include a soft robot actuator. The soft robot actuator can include a flexible actuator comprising a plurality of molded flexible units, wherein each molded flexible unit comprises a mechanical connector configured to couple to another molded flexible unit, wherein the plurality of coupled molded flexible units are arranged to define a fluidic chamber; and an inlet coupled to the fluidic channel, wherein the inlet is configured to couple the fluidic channel to a pressurized fluidic source or a depressurized fluidic source to inflate or deflate a portion of the flexible actuator.

In some embodiments, the each molded flexible unit comprises a male mechanical connector and a female mechanical connector, wherein the male mechanical connector of a first molded flexible unit is configured to couple to a female mechanical connector of a second molded flexible unit.

In some embodiments, the male mechanical connector comprises a peg and a female mechanical connector comprises a recess.

In some embodiments, the mechanical connector comprises a single taper dovetail joint configured to provide a resistance to a tensile strain along a single lateral direction.

In some embodiments, the mechanical connector comprises a double taper dovetail joint configured to provide a resistance to a tensile strain along two direction.

In some embodiments, one of the molded flexible units comprises a heterogeneous material, and further wherein the mechanical connector on the one of the molded flexible units is formed using a stiffer material compared to that of its body.

In some embodiments, the plurality of molded flexible units is stacked on top of one another to form the flexible actuator.

In some embodiments, one or more of the plurality of molded flexible units comprises holes, and the holes are aligned to form the fluidic channel.

In some embodiments, some of the plurality of molded flexible units are arranged perpendicular to one another, thereby forming a cube actuator.

In some embodiments, the mechanical connector is positioned along an edge of the molded flexible unit, and at least two of the molded flexible units are coupled to one another using the mechanical connector positioned along the edge of the molded flexible units.

In some embodiments, one of the plurality of molded flexible units comprises a portion of a molded block have has been cut using a cutting tool.

In some embodiments, the cutting tool comprises one of a razor blade, a knife, and scissors.

In some embodiments, the plurality of molded flexible units comprises a first molded flexible unit and a second molded flexible unit, wherein the first molded flexible unit is less stiff as compared to the second molded flexible unit, and wherein upon pressurization or depressurization of the fluidic channel, the first molded flexible unit is configured to expand more than the second molded flexible unit.

In some embodiments, the first molded flexible unit and the second molded flexible unit comprise a sidewall of the fluidic channel, thereby providing a control of a direction and magnitude of expansion upon pressurization or depressurization.

In some embodiments, the first molded flexible unit is stacked on top of the second molded flexible unit, thereby providing a control of a location and magnitude of expansion along the fluidic channel upon pressurization or depressurization.

In some embodiments, one of the molded flexible unit has a square-shape.

In some embodiments, the soft robotic actuator includes a glue between two molded flexible units for forming an air-tight coupling between the two molded flexible units.

In some embodiments, the glue comprises a polydimethylsiloxane prepolymer.

In some embodiments, the glue comprises a liquid Ecoflex prepolymer.

In some embodiments, a portion of one of the molded flexible units comprises a stiff material that is configured not to inflate or deflate upon pressurization or depressurization.

Some of the disclosed embodiments include a modular soft robot. The modular soft robot includes a plurality of soft robotic actuators in accordance with some embodiments; and a fluidic inlet coupled to the inlets of the plurality of soft robotic actuators, wherein the fluidic inlet is configured to receive pressurized or depressurized fluid and to provide the received fluid to the inlets of the plurality of soft robotic actuators to inflate or deflate a portion of the plurality of soft robotic actuators.

Some of the disclosed embodiments include a method of building a soft robot actuator. The method includes providing a plurality of flexible elementary units comprising a mechanical connector configured to provide a physical coupling to another flexible elementary unit; arranging the plurality of flexible elementary units to form a flexible actuator having an embedded fluidic channel; and providing an inlet coupled to the embedded fluidic channel, wherein the inlet is configured to receive pressurized or depressurized fluid to inflate or deflate a portion of the flexible actuator, thereby causing an actuation of the flexible actuator.

In some embodiments, the mechanical connector comprises a male mechanical connector and a female mechanical connector, wherein the male mechanical connector of a first flexible elementary unit is configured to couple to a female mechanical connector of a second flexible elementary unit.

In some embodiments, the male mechanical connector comprises a peg and a female mechanical connector comprises a recess.

In some embodiments, the mechanical connector comprises a single taper dovetail joint configured to provide a tensile strain along a single lateral direction.

In some embodiments, the mechanical connector comprises a double taper dovetail joint configured to provide a tensile strain along two directions.

In some embodiments, one of the molded flexible units comprises a heterogeneous material, and further wherein the mechanical connector on the one of the molded flexible units is formed using a stiffer material compared to that of its body.

In some embodiments, arranging the plurality of flexible elementary units comprises stacking one of the flexible elementary units on top of another one of the flexible elementary units to form the flexible actuator.

In some embodiments, one or more of the plurality of flexible elementary units comprises holes, further wherein the method comprises aligning the holes to form the fluidic channel.

In some embodiments, the plurality of flexible elementary units comprises a first flexible elementary unit and a second flexible elementary unit, wherein the first flexible elementary unit is less stiff compared to the second flexible elementary unit, and wherein upon pressurization or depressurization of the fluidic channel, the first flexible elementary unit is configured to expand more than the second flexible elementary unit.

In some embodiments, arranging the plurality of flexible elementary units comprises arranging the first flexible elementary unit and the second flexible unit as a sidewall of the fluidic channel, thereby providing a control of a direction and magnitude of expansion upon pressurization or depressurization.

In some embodiments, arranging the plurality of flexible elementary units comprises stacking the first flexible elementary unit with the second flexible unit.

In some embodiments, the method further includes providing a glue between two flexible elementary units for forming an air-tight coupling between the two flexible elementary units.

In some embodiments, the glue comprises a polydimethylsiloxane prepolymer.

In some embodiments, the glue comprises a liquid Ecoflex prepolymer.

In some embodiments, a portion of one of the molded flexible units comprises a stiff material that is configured not to inflate or deflate upon pressurization or depressurization.

In some embodiments, providing a plurality of flexible elementary units comprises cutting, using a cutting tool, one of the plurality of flexible elementary units from a molded block.

In some embodiments, the cutting tool comprises one of a razor blade, a knife, and scissors.

Some of the disclosed embodiments include a method of actuating a soft robotic actuator. The method includes providing a soft robotic actuator in accordance with some embodiments, and providing pressurized or depressurized fluid to the inlet of the soft robotic actuator to cause an expansion of a wall of the soft robotic actuator, thereby causing an actuation of the soft robotic actuator.

BRIEF DESCRIPTION OF THE DRAWINGS

FIGS. 1A-1C illustrate elementary units with peg/recess connectors in accordance with certain embodiment.

FIGS. 2A-2G illustrate elementary units with lateral connectors and how these elementary units can be joined to form a cube actuator in accordance with some embodiments.

FIGS. 5A-5B illustrate a stretching soft robot in accordance with some embodiments.

FIGS. 8A-8E illustrate a mechanism for forming a soft robot actuator using elementary units in accordance with some embodiments.

FIGS. 11A-11G also illustrate that the direction and magnitude of expansion due to pressurization can be controlled by using elementary units having different strain characteristics.

FIGS. 12A-12E illustrate a prism-like actuator assembled from rectangular elementary units in accordance with some embodiments.

FIGS. 13A-13D illustrate a process of building a cross-shaped actuator, assembled from cross-shaped elementary units, and its expansion characteristics in accordance with some embodiments.

FIGS. 14A-14E illustrate coupling two or more cube actuators using connectors in accordance with some embodiments.

FIGS. 15A-15E illustrate a cube actuator assembled using elementary units with more than one material in accordance with some embodiments.

FIGS. 17A-17D illustrate a multi-channel actuator in accordance with some embodiments.

DETAILED DESCRIPTION

Figure 3C:
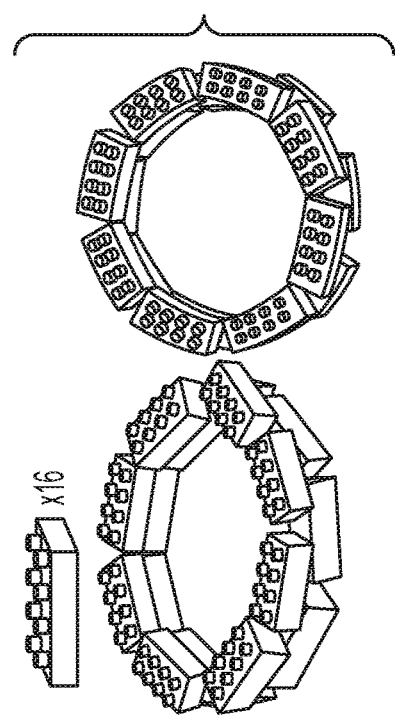
FIGS. 3A-3C illustrate a bending soft robot in accordance with some embodiments.

Prototyping soft robots often includes three major steps: a master mold design, a master mold fabrication based on the master mold design, and a soft robot fabrication using the master mold. The first two steps, the master mold design and fabrication, are often time consuming and challenging. Furthermore, once the master mold is designed/fabricated, the master mold is difficult to modify. If a master mold needs to be changed to accommodate certain changes in the specification, a new master mold needs to be designed and fabricated, which further increases the turn-around time for soft robot developments. Therefore, designing and testing soft robots remain a challenging and time consuming task.

Some embodiments of the present disclosure relate to modularized mechanisms for prototyping soft robots, aimed at facilitating the design and testing of new soft robots. In particular, soft robots of arbitrary shapes and functionalities can be prototyped by assembling modules of predetermined shapes, called elementary units. The elementary units are capable of interlocking using mechanically robust and, optionally, air tight connections so that assembled robots with varying dimensions and shapes can be made using a few elementary shapes. The elementary units can be formed from soft, elastomeric materials using a single master, and they can be simply and rapidly assembled to create new soft robots with unique functions. These capabilities enable the user to quickly survey many different soft robot designs—actuator style, geometry, and materials composition—without ever needing to design/fabricate a new master.

An elementary unit is a flexible body that includes mechanical features, which allow the elementary unit to connect to or mate with other elementary units. In some embodiments, the elementary unit can be fabricated using a soft material. For example, the elementary unit can be fabricated using an elastomer. This allows the elementary unit to exhibit flexibility and change shape in response to an external force. As illustrated below, the elementary unit can be configured to bend, twist, morph, stretch, or curl in response to an external force.

In some embodiments, the flexibility of the elementary unit can be controlled by controlling a size of a cavity within the elementary unit. For example, the elementary unit can be filled up (i.e., solid), which would increase a stiffness of the elementary unit. In other embodiments, the elementary units can be hollow, which would decrease a stiffness of the elementary unit.

In some embodiments, the elementary unit is in the shape of a block or parallelepiped. The parallelepiped elementary unit can include a rectangular cuboid elementary unit (six rectangular faces), a cube elementary unit (six square faces), and a rhombohedron elementary unit (six rhombus faces.) In some cases, the elementary unit can be thin (i.e., the width and length of the elementary unit can be substantially larger compared to the height of the elementary unit.) A thin elementary unit can be assembled to provide a soft robot with a large flexibility.

The interlocking mechanical feature of the elementary unit can include projections and their complementary cavities, often referred to as male and female connections. In some cases, the projections and their complementary cavities can be located on upper and lower surfaces, respectively, of the parallelepiped shaped elementary unit. In other embodiments, the interlocking mechanical feature can be located along the edges of the elementary unit. Such a lateral interlocking mechanical feature allows an elementary unit to couple to another elementary unit laterally. The interlocking mechanical features, also referred to as mechanical connectors, are capable of rotatingly connecting with the mechanical connectors of neighboring units. In some embodiments, the connections, or joints, formed between elementary units can be sealed to provide an airtight seal. The interlocking mechanical features can include a peg/recess pair, a single-taper dovetail connector, and a double-taper dovetail connector.

In some embodiments, the elementary units can be assembled and coupled to one another to form a soft robot. The soft robot can include a plurality of elementary units that are arranged to form a desired volumetric shape. In some embodiments, the soft robot can be shaped as a polyhedron having a plurality of faces. In some cases, each face of the polyhedron volume can be formed using one or more elementary units. In other cases, the polyhedron can be formed by stacking a plurality of elementary units. In yet other cases, the polyhedron can include two parts, the first part formed by stacking a plurality of elementary units and the second part formed by laterally adjoining the elementary units to form some of the faces of the polyhedron.

In some embodiments, the soft robot assembled using elementary units can be an actuator that is configured to move in response to pressurized or depressurized fluid. In particular, the soft robot can include a fluidic channel that can receive pressurized or depressurized fluid. In some cases, the fluidic channel can include a cavity formed by faces of the polyhedron. For example, one or more elementary units can form faces of a hollow polyhedron, and the cavity of the hollow polyhedron can form a fluidic channel of the polyhedron. In other cases, the fluidic channel can be formed by aligning a hole in elementary units. For example, a soft robotic actuator can be formed by stacking a plurality of elementary units, where each elementary unit can include a hole. By aligning the holes in the elementary units, the holes can collectively form a fluidic channel that can receive pressurized or depressurized fluid. The shape of the hole can determine a shape of a cross-section of the fluidic channel. The hole in the elementary unit can be shaped as a circle, a square, a rectangle, a polygon, a star, or any other desirable shape for the cross-section of the fluidic channel.

The response of the soft robotic actuator can be controlled by controlling the width of the fluidic channel. The width of the fluidic channel can be controlled by controlling the size of the polyhedron, the thickness of elementary units, or the size of holes in elementary units.

In some cases, once a soft robot has been designed using elementary units, a unique master can be created to directly replicate the prototype as a final product. This property of a modular soft robot design can dramatically improve the design of soft machines tailored to a specific application or task. The ability to use one mold to fabricate different elementary units that can be used to assemble a variety of different elastomeric structures, is valuable, especially in situations where design resources are limited or when a robot has to be fabricated without much preparation, without precisely defined specifications. The disclosed embodiments enable many groups (e.g., scientists, students, and engineers), who may not have access to specialized instruments (e.g., 3D printers), to design, prototype, and explore new soft machines.

FIG. 1 illustrates soft elementary units having projections and complementary cavities in a parallelepiped or block building unit in accordance with some embodiments. In FIG. 1A, the left figure shows the perspective view of an elementary unit 100 containing a single projection 110 on an upper surface 120 of the unit and a single complementary shaped recession 130 on the lower surface 140 of the unit, and the right figure shows the cross-sectional view 150 of the elementary unit 100. Exemplary dimensions for the height and width of the unit and the projection and cavity are shown in the figures; however, these dimensions are for purpose of illustration and a range of sizes can be used, depending on the anticipated prototyping and the limits of any molding techniques used. The mechanical features of the elementary unit can physically couple it to another elementary unit.

In some embodiments, the mechanical features in the elementary unit can include a cylindrical peg, functioning as a male connector, and a cylindrical recess that is designed to mate with the cylindrical peg connector in another elementary unit. The cylindrical peg can be directly above a cylindrical recess, as illustrated in FIG. 1A, which allows the two elementary units to stack directly one on top of the other; however this is not required.

In the present disclosure, the face with the peg are called the positive face and the opposite face with the recess is called the negative face. The axis of the peg/recess is represented by a vertical arrow in the left figure of FIG. 1A. While illustrated as a cylindrical cross-section, the projections and recessions can have any geometry, such as square, oval, or rectangular cross-section. In some cases, the elementary unit can have more than one set of mechanical features. FIG. 1B illustrates an elementary unit 160 having a 2×3 array of mechanical connectors.

FIG. 1C is a series of photographs illustrating various ways in which two elementary units can be assembled in accordance with some embodiments. The upper photograph shows two identical elementary units (except for coloring) showing the upper 2×3 array of projections 170 (left block) and lower 2×3 array of cavities 180 (right block). The remaining photographs illustrate that some or all of the pegs/recesses can be used to connect two arrays of 2×3 elementary units 170, 180 together. The scale bar is 1 cm and is shared by all images in the panel. In assembling the elementary units, because the elementary units are formed using a flexible material, the pegs of the elementary unit 170 can squeeze into the recess of the other elementary unit 180. In some embodiments, the elementary unit can be hollow. If made hollow, however, the elementary unit would be too flexible for certain applications. Therefore, in other embodiments, the elementary unit can be filled up (i.e., solid.)

In some embodiments, the elementary units can be assembled into a soft robot. The soft robot can include one or more elementary units. In some cases, the soft robot can be formed by stacking the elementary units on top of one another. In other cases, the soft robot can be formed by laterally adjoining the elementary units as discussed below. In some cases, two or more elementary units in the soft robot can have an identical shape.

In some embodiments, the soft robot can be actuated using pressurized or depressurized fluid. For example, the soft robot can include a fluidic channel that can receive pressurized or depressurized fluid, and the soft robot can be actuated in response to receiving the pressurized or depressurized fluid. In some cases, the fluidic channel can include a cavity formed by an arrangement of the elementary units. In other cases, the fluidic channel can be formed by holes in the stacked elementary units, as disclosed further below.

In some embodiments, the mechanical features in the elementary unit can include connectors arranged laterally. The lateral connectors can couple the elementary units laterally. FIGS. 2A-2G illustrate elementary units with lateral connectors and how these elementary units can be joined to form a cube actuator in accordance with some embodiments.

A lateral connector can include a single-taper dovetail joint, a double-taper dovetail joint, and a peg/recess joint. FIG. 2A illustrates a schematic of a single-taper dovetail joint, having a single-taper dovetail cavity 210 (top) and its mating pin 220 (bottom), in accordance with some embodiments; FIG. 2B illustrates a schematic of a double-taper dovetail joint, having a double taper dovetail 230 (top) and the mating pin 240 (bottom), in accordance with some embodiments; and FIG. 2C illustrates a schematic of a peg/recess joint, having a peg 250 (top) and a recess 260 (bottom), in accordance with some embodiments.

The single-taper dovetail joint can include a single-taper dovetail cavity 210 (i.e., a female single-taper dovetail joint) and its mating pin 220 (i.e., a male single-taper dovetail joint.) The cavity 210 can be formed by two adjacent tails 230, 240. The male single-taper dovetail joint 220 can be configured to be coupled to the female single-taper dovetail joint 210 by a mechanical interlocking. The single-taper dovetail joint can provide a fit (or a resistance to a tensile strain) between two elementary units along a single lateral direction. For example, when a first elementary unit, arranged parallel to a plane, is coupled to a second elementary unit, arranged perpendicular to the plane, the first elementary unit can limit the movement of the second elementary unit along the plane. For example, the mating pin 220 and the tails 230, 240 are defined by a single and complementary taper angle.

The double-taper dovetail joint can include a double-taper dovetail cavity 230 (i.e., a female double-taper dovetail joint) and its mating pin 240 (i.e., a male double-taper dovetail joint.) The cavity 230 can be formed by two adjacent tails 250, 260. The male double-taper dovetail joint 240 can be configured to be coupled to the female double-taper dovetail joint 230 by a mechanical locking. A double-taper dovetail joint can provide a resistance to a tensile strain in two directions, based on the shape of the surface in the double-taper dovetail joint. The pins and tails have two complementary taper angles, also sometimes referred to as characteristic angles. The characteristic angles can determine the directions in which the double-taper dovetail joint provides a resistance to a tensile strain. In particular, the double-taper dovetail joint can resist force along the orthogonal direction of both pieces. The pin 240 would be "gripped" by the tails 250, 260 in the same way the tails 250, 260 are "gripped" by the pin 240.

This double-taper dovetail joint is only feasible in soft materials because the shape of the double-taper dovetail joint is such that two hard-material-based double-taper dovetail joint cannot be joined to one another without breaking the double-taper dovetail joint. Because the double-taper dovetail joint has two characteristic angles, the pin 240 does not readily slide in or out of the tails 250, 260. In other words, the pin 240 and the tails 250, 260 are shaped so that they can fit only by squeezing a male double-taper dovetail joint into a female double-taper dovetail joint.

The peg/recess joint can include a peg 250 and a recess 260. The peg/recess joint can provide a fit between two elementary units, and if a width of the recess 260 is slightly smaller than a width of the peg 250, the peg/recess joint can provide a resistance to a tensile strain in one direction.

In some embodiments, an elementary unit can include one type of joints. In other embodiments, an elementary unit can include two or more types of joints. For example, one edge of an elementary unit can include a single-taper dovetail joint, and another edge of the same elementary unit can include a double-taper dovetail joint.

In some embodiments, the elementary units with lateral connectors can be used to build a cube soft robot. FIG. 2D illustrates the top-down view of the elementary units used to assemble a cube soft robot in accordance with some embodiments. In some embodiments, a cube soft robot can be built using two or more unique elementary units due to edge constraints of a cube. The elementary units of the cube can use any type of lateral connectors, including a single taper dovetail joint or a double taper dovetail joint. In some embodiments, the elementary units for the cube soft robot can be fabricated using polydimethilsiloxane (PDMS.) FIG. 2E illustrates how a cube actuator can be assembled using the three types of elementary units. The orientation of one face is marked with an arrow 270. FIGS. 2F-2G illustrate a fully-assembled PDMS cube robot from different perspectives.

The lateral connectors are not limited to single taper dovetail connectors, double taper dovetail connectors, or peg/recess connectors. While certain mechanical characteristics may change due to using different types of lateral connectors, the fundamental concepts and capabilities of the modular soft robots would remain the same regardless of the type of connectors used.

In some embodiments, elementary units can be fabricated using a single, large master mold. For example, a large master mold can be used to create a 9×6 rectangular array of the elementary units, called a master unit, and the master unit can be cut to form elementary units of different shapes and dimensions. Due to its softness, the master unit can be cut using simple, inexpensive tools, such as a razor blade, a knife, or scissors. The ability to create elementary units of arbitrary dimensions and shapes by cutting a master unit is a unique advantage of using soft materials for the elementary units.

In some embodiments, the master unit can be fabricated using a single material to form a homogeneous master unit. In other embodiments, the large master mold can be filled with layers of different materials to create a heterogeneous master unit. In some cases, the heterogeneous master unit can have connectors having different mechanical properties compared to those of the body (i.e., the rest of the master unit.) In particular, the connectors can be built using a stiffer material compared to that of the body. For example, the connectors on the master unit can be formed using a PDMS, and the rest of the master unit can be formed using an elastomer, such as Ecoflex. Such a composition of elementary units can allow for easy, reliable connections over repeated cycles without the need to fuse (or glue) the elementary units together.

FIGS. 3-6 illustrate a functional capability of soft elementary units in accordance with some embodiments. The soft elementary units can be assembled to form a soft robot that can accommodate a variety of motions and structures not feasible with hard building blocks. In particular, a soft robot built using soft elementary units can accommodate bending, twisting, stretching, or morphing, which is not feasible with hard building blocks. These figures illustrate a soft robot having composite elementary units where the mechanical connectors were made of slightly stiffer material compared to the body. For example, the mechanical connectors of the elementary units were made of a slightly stiff PDMS, and the body of the elementary units were made of highly extensible Ecoflex.

Figure 3B:
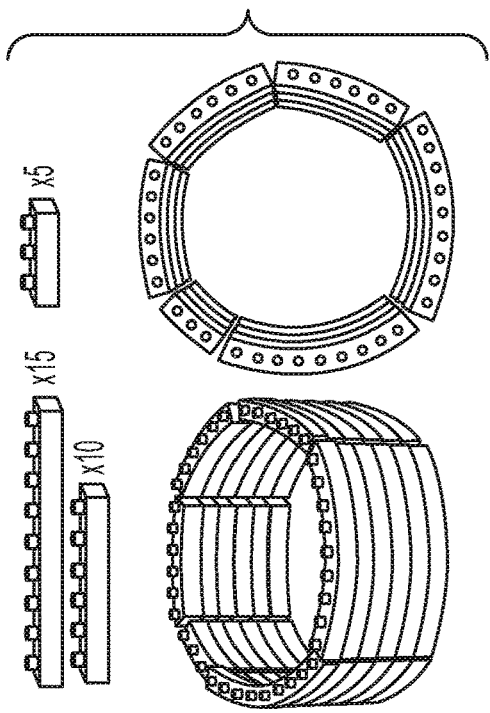
Figure 3A:
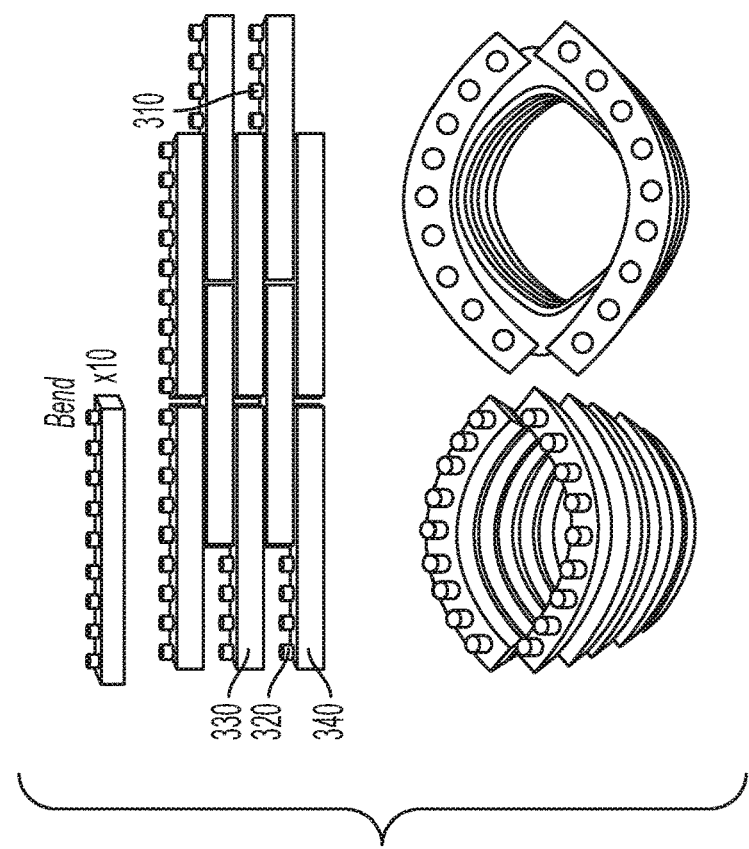

FIGS. 3A-3C illustrate a bending soft robot in accordance with some embodiments. FIG. 3A shows a layer of bending soft robot, formed by stacking elementary unit in a staggered manner. The layer of bending soft robot can include a protruding elementary unit 310 and a void 320 formed between two other protruding elementary units 330, 340. The layer of bending soft robot can be wrapped around, leveraging the flexible nature of elementary units, so that the protruding elementary unit 310 is interlocked to the two protruding elementary units 330, 340 using the connectors on the units 310, 330, 340. FIGS. 3B-3C illustrate other examples of bending soft robots built using other types of basic elementary units. The flexible nature of elementary units allows robot designers to build soft robots having a variety of shapes and functionality using basic elementary units.

Figures 4A, 4B, 4C:
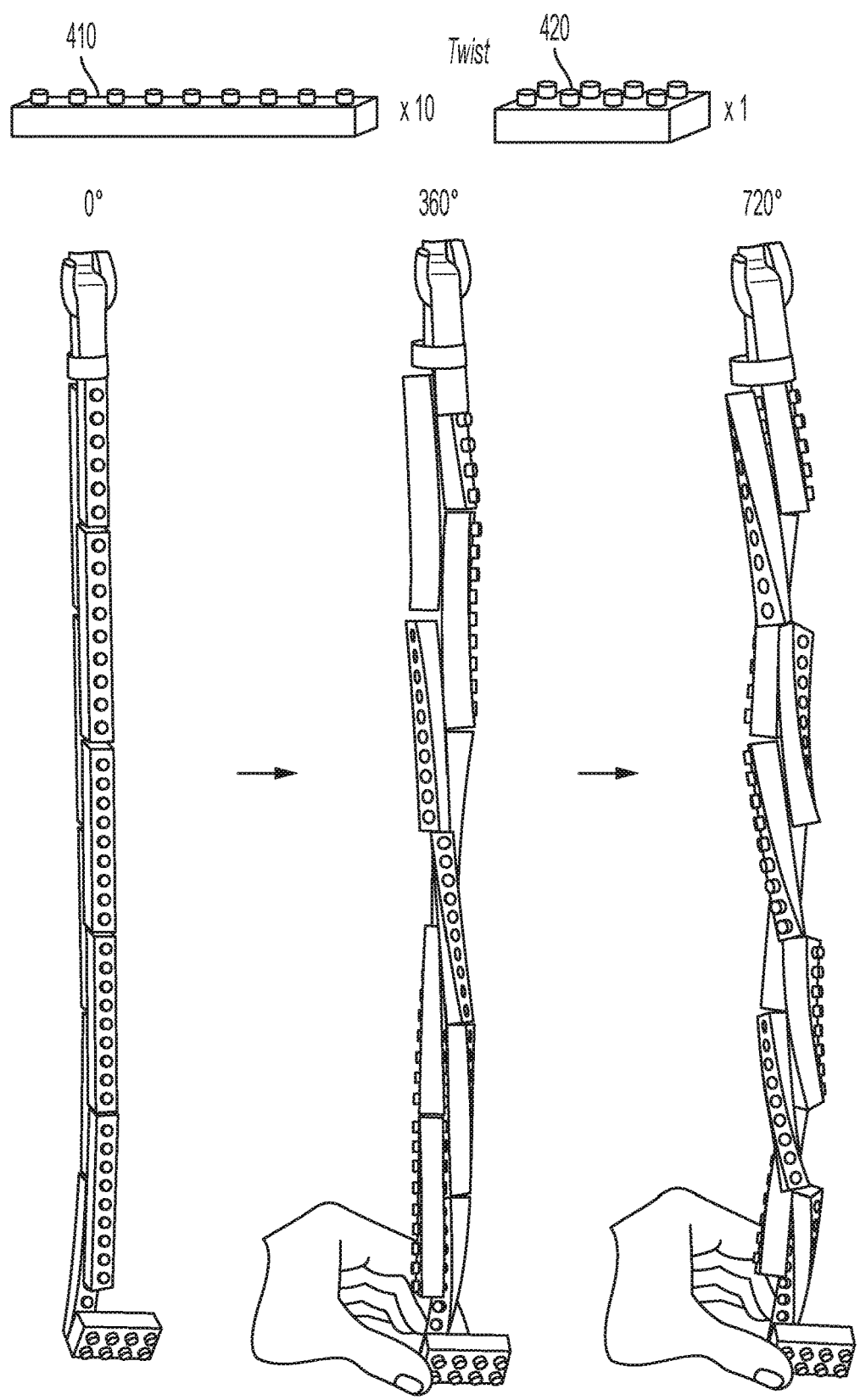
FIGS. 4A-4C illustrate a twisting soft robot in accordance with some embodiments.

FIGS. 4A-4C illustrate a twisting soft robot in accordance with some embodiments. In some cases, a twisting soft robot can be built by connecting two types of elementary units 410, 420. In the illustration, the twisting soft robot includes 10 rectangular elementary units 410 having a 1×9 array of connectors, and one rectangular elementary unit 420 having a 2×4 array of connectors. The twisting soft robot can be formed by staggering the 1×9 elementary unit 410 in two layers, and coupling the 2×4 elementary unit 420 at the bottom. FIG. 4A shows a twisting soft robot at its relaxed state (i.e., twist of 0 degree.) This twisting soft robot can be twisted along a central axis of the twisting robot, as illustrated in FIGS. 4B-4C in accordance with some embodiments.

FIGS. 5A-5B illustrate a stretching soft robot in accordance with some embodiments. In some cases, a stretching soft robot can be built by connecting elementary units 510. The stretching soft robot can be formed by staggering the 1×9 elementary units 510 in two layers, as illustrated in FIG. 5A. Because each elementary unit is soft and flexible, the stretching soft robot can extend in response to a lateral pulling force applied at each end of the robot, as illustrated in FIG. 5B.

Figure 6A:
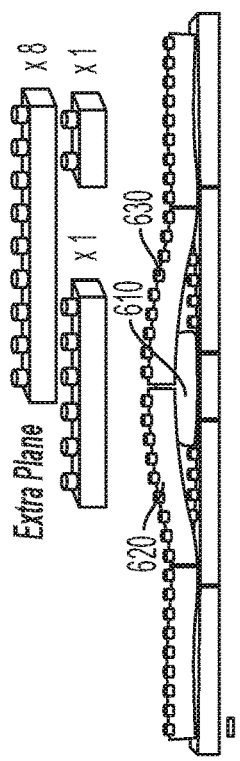
FIGS. 6A-6C illustrate additional examples of a versatile soft robot that is hard to design or manufacturer using hard, stiff building blocks, in accordance with some embodiments.
Figure 6C:
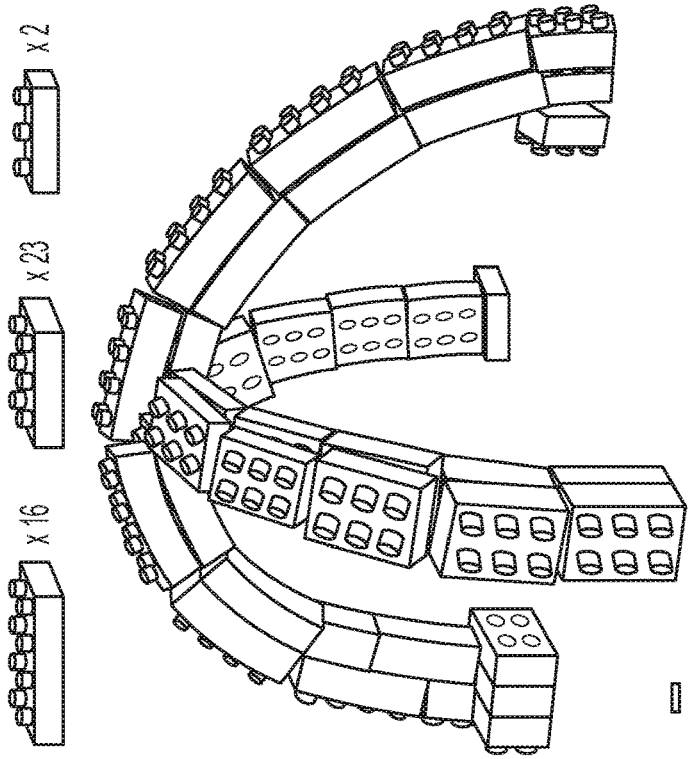
Figure 6B:
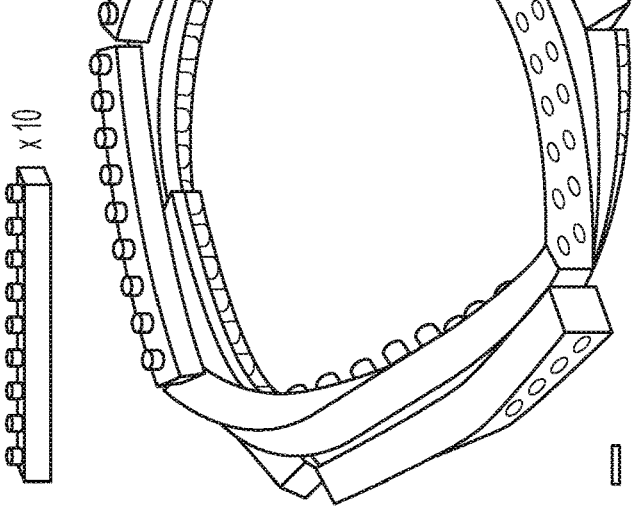

FIGS. 6A-6C illustrate additional examples of a versatile soft robot that is hard to design or manufacturer using hard, stiff building blocks, in accordance with some embodiments. FIG. 6A shows that, because elementary units are soft and flexible, the elementary units can be stacked with an uneven height. For example, FIG. 6A shows a robot that includes a bump 610. The bump 610, however, does not cause any issue because the adjacent elementary units 620, 630 can bend to accommodate the bump 610. FIG. 6B shows that, because elementary units are soft and flexible, a Mobius strip can be formed by stacking elementary units, twisting them along their central axis, and coupling the two ends of the strip. FIG. 6C shows that, by bending the elementary units about axes orthogonal to the axis of the peg/recess, a double arch structure can be created. This double arch structure could support a load without a permanent coupling of the elementary units. FIGS. 3-6 therefore illustrates that the soft elementary units provide unique and desirable means for building structures of a variety of characteristics.

Figure 7A:
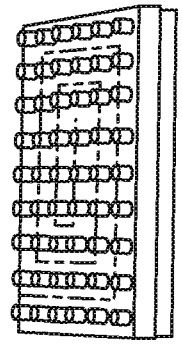
FIGS. 7A-7H illustrate a process of creating and using elementary units of different shapes in accordance with some embodiments.
Figure 7B:
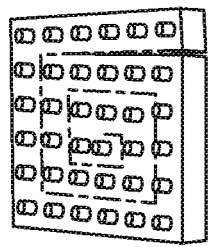
Figure 7C:
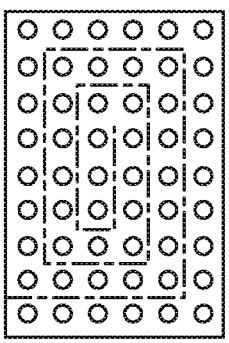
Figure 7D:
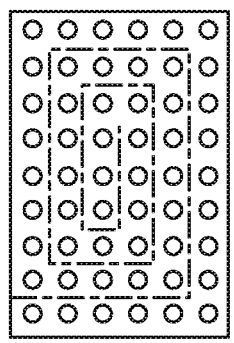
Figure 7E:
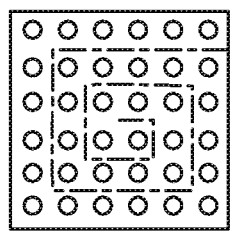
Figure 7F:
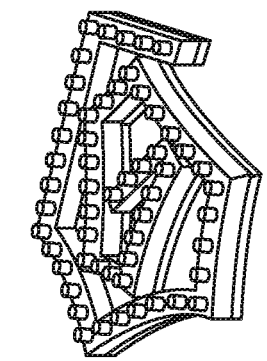
Figure 7G:
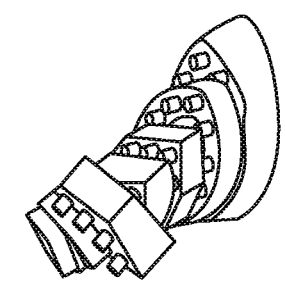
Figure 7H:
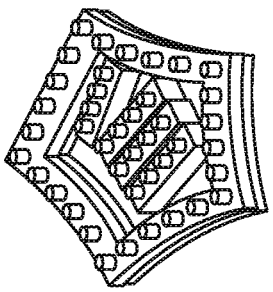

FIGS. 7A-7H illustrate a process of creating and using elementary units of different shapes in accordance with some embodiments. Because of a versatile nature of the soft elementary units, the elementary units do not need to be cut into rectangular arrays. Instead, the elementary units can be cut into arbitrary shapes and be assembled into various three-dimensional structures that are impossible with rigid building blocks. For example, FIGS. 7A-7B illustrate a top-down view of a master unit that is configured to be cut into a spiral shape, as illustrated using the dotted lines. The dotted lines indicate the trace of the cuts. The resulting elementary unit is called a spiral elementary unit. FIGS. 7C-7D illustrate spiral elementary units in a furled state, and FIGS. 7E-7F illustrate the spiral elementary units in the unfurled state. The spiral elementary units can be used to build certain structures that are not possible with rigid body blocks. For example, FIGS. 7G-7H illustrate structures built using the spiral elementary units of FIGS. 7C-7D, respectively.

In some embodiments, elementary units can be assembled to form a soft robot actuator that is configured to move in response to pressurized or depressurized fluid. In particular, the soft robot can include a fluidic channel that can receive pressurized or depressurized fluid. In some cases, the fluidic channel can include a cavity formed by faces of the polyhedron. For example, one or more elementary units can form faces of a hollow polyhedron, and the cavity of the hollow polyhedron can form a fluidic channel of the polyhedron.

FIGS. 8A-8E illustrate a mechanism for forming a soft robot actuator using elementary units in accordance with some embodiments. As illustrated in FIG. 8A, the soft robot actuator includes 12 rectangular elementary units 810 having 1×4 array of connectors, and 2 rectangular elementary units 820 having 5×5 array of connectors. These elementary units can be assembled in five layers, as illustrated in FIG. 8B, in order to build a cube actuator. For example, the two 5×5 elementary units 820 form a top plane 830 and a bottom plane 840 of the cube actuator, and the top plane 830 and the bottom plane 840 are arranged to sandwich three layers of 1×4 elementary units, thereby forming a cube actuator with an outer wall formed by the three layers of 1×4 elementary units. The resulting structure has a void space (i.e., a cavity) in the middle that can serve as a fluidic channel for pressurization or depressurization.

FIGS. 8C-8E show a shape of the cube actuator at its resting state, in a pressurized state, and in a depressurized state, respectively. At its resting state, the cube actuator is shaped as a cube, i.e., in accordance with FIG. 8B. Pressurized or depressurized fluid can be provided to the cube's cavity via a fluid inlet 850, as illustrated in FIGS. 8C-8E. As illustrated in FIG. 8D, the cube actuator can inflate when the void space is pressurized via the fluid inlet 850, and, as illustrated in FIG. 8E, the cube actuator can deflate when the void space is depressurized (i.e., negatively pressurized) via the fluid inlet 850. In some embodiments, the void space can be pressurized or depressurized externally by coupling the fluid inlet 850 to a pneumatic pump. In some embodiments, the fluid inlet 850 can be narrow and the walls forming the cube actuator can be flexible. This way, when no external pressure is applied, the pneumatic channel is locked (e.g., closed.)

In some cases, it may be desirable to form air-tight connections between elementary units of the actuator. For example, when certain parts of the modular soft robot, built using the elementary units, include a fluidic channel, it is desirable to limit an air leakage from the fluidic channel or an air influx to the fluidic channel due to a gap between elementary units. In some embodiments, air-tight connections between elementary units can be formed using a glue like material that physically couples the elementary units together. The glue like material can be liquid PDMS prepolymer or liquid Ecoflex prepolymer.

As illustrated in FIGS. 8C-8E, when all the elementary units are made of the same material, such as Ecoflex, the cube actuator is configured to expand into a spheroid upon pressurization. In some embodiments, the modular soft robot can be designed so that the direction and magnitude of expansion due to pressurization is controlled. The direction and magnitude of expansion can be controlled by building robots using elementary units having different strain characteristics (i.e., different Young's moduli.)

Figures 9A, 9B, 9C, 9D, 9E:
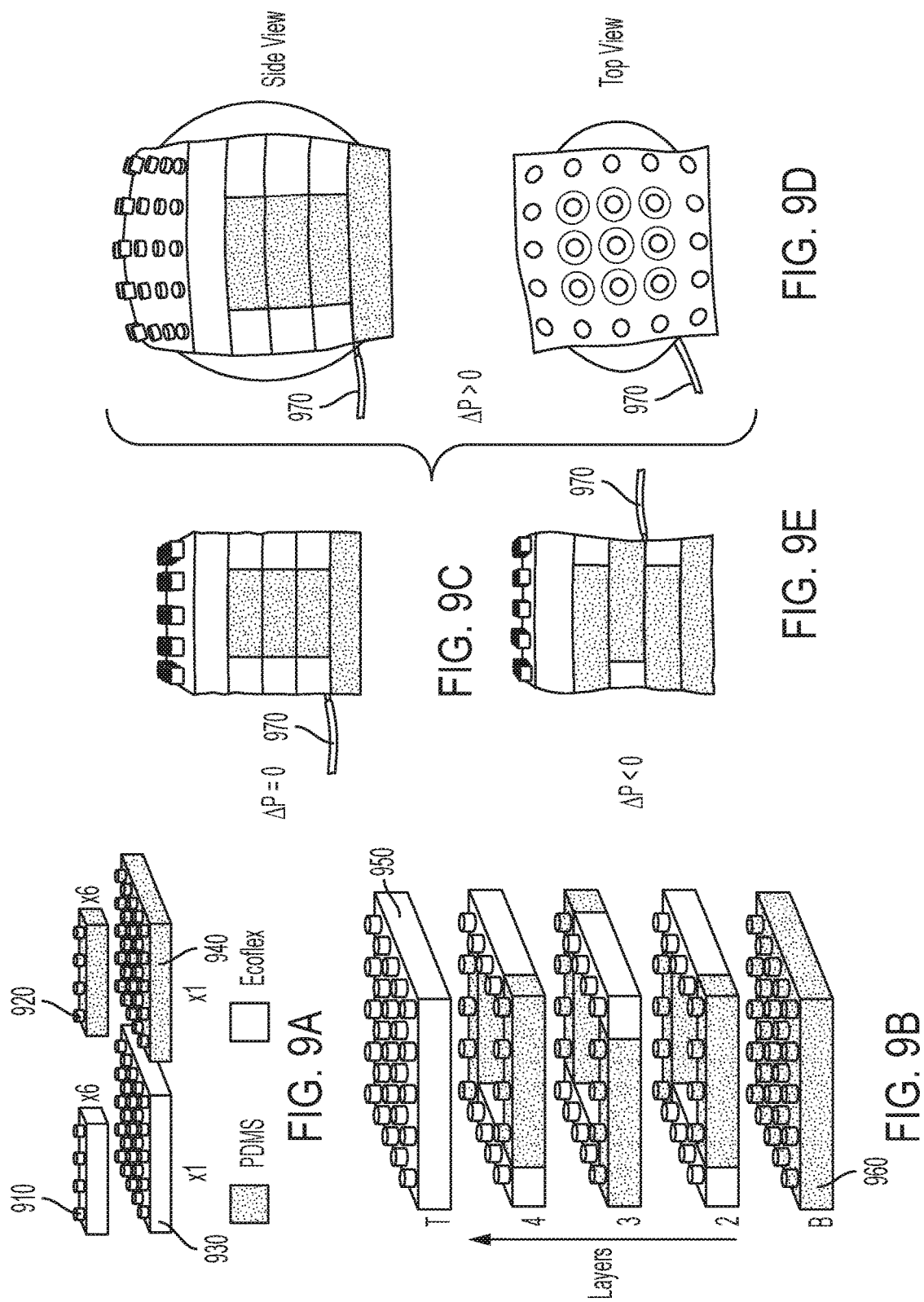
FIGS. 9A-9E illustrate a soft robot actuator configured to exhibit an anisotropic actuation in accordance with some embodiments.

FIGS. 9A-9E illustrate a soft robot actuator configured to exhibit an anisotropic actuation in accordance with some embodiments. The anisotropic cube actuator can be built using elementary units made of different materials. As illustrated in FIG. 9A, the illustrative anisotropic cube actuator can be built using elementary units based on a soft elastomer, such as Ecoflex, and elementary units based on a relatively stiffer material, such as PDMS. In this particular example, the anisotropic cube actuator is built using 6 1×4 soft elementary unit 910, one 5×5 soft elementary unit 920, 6 1×4 stiffer elementary unit 930, and one 5×5 stiffer elementary unit 940.

FIG. 9B illustrates an arrangement of the elementary units in the anisotropic cube actuator in accordance with some embodiments. In this case, a soft elementary unit 910 is facing another soft elementary unit 910, and a stiffer elementary unit 920 is facing another stiffer elementary unit 920. Therefore, upon pressurization, the two sides comprising the soft elementary units 910 will expand more than the other two sides comprising the stiffer elementary units 920. Similarly, upon depressurization, the two sides comprising the soft elementary units 910 will deflate more than the other two sides comprising the stiffer elementary units 920. Also, the top layer 950 is formed using a soft elementary unit 930, and the bottom layer 960 is formed using a stiffer elementary unit 960. Therefore, upon pressurization, the top layer 950 is configured to expand more than the bottom layer 960. Similarly, upon depressurization, the top layer 950 is configured to deflate more than the bottom layer 960. The stiffer elementary units can also be referred to as strain-limiting elementary units.

FIGS. 9C-9E show a shape of the anisotropic cube actuator at its resting state, in a pressurized state, and in a depressurized state, respectively. At its resting state, the anisotropic cube actuator is shaped as a cube, i.e., in accordance with FIG. 9B. Pressurized or depressurized fluid can be provided to the cube's cavity via a fluid inlet 970. As illustrated in FIG. 9D, the cube actuator can inflate when the void space is pressurized via the fluid inlet 970, and, as illustrated in FIG. 9E, the cube actuator can deflate when the void space is depressurized (i.e., negatively pressurized) via the fluid inlet 970. Because of the difference in relative stiffness, the sides comprising a soft elementary unit can expand or deflate more than the sides comprising a strain-limiting elementary unit, thereby providing an anisotropic expansion or deflation.

Figure 10C:
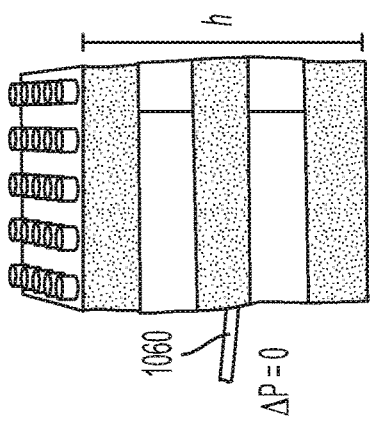
FIGS. 10A-10E illustrate another class of an anisotropic soft robot actuator in accordance with some embodiments.
Figure 10D:
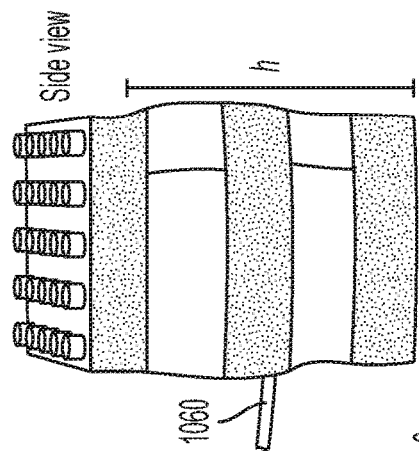
Figure 10E:
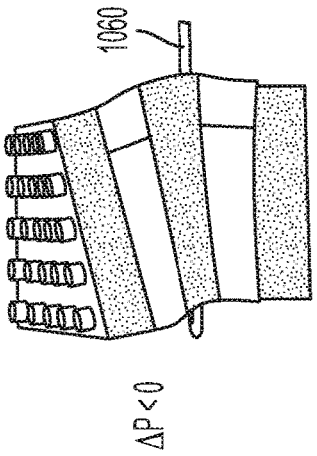
Figure 10A:
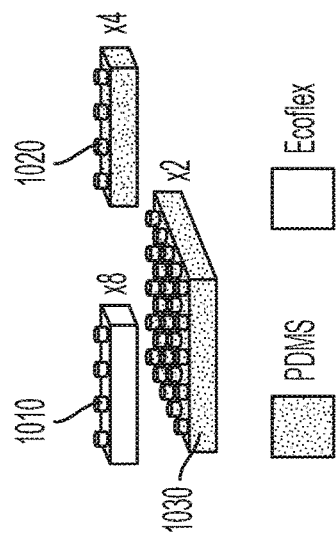

FIGS. 10A-10E illustrate another class of an anisotropic soft robot actuator in accordance with some embodiments. As illustrated in FIG. 10A, the illustrative anisotropic cube actuator can be built using elementary units based on a soft elastomer, such as Ecoflex, and elementary units based on a relatively stiffer material, such as PDMS. In this particular example, the anisotropic cube actuator is built using 8 1×4 soft elementary unit 1010, 4 1×4 stiffer elementary unit 1020, and two 5×5 stiffer elementary unit 1030.

Figure 10B:
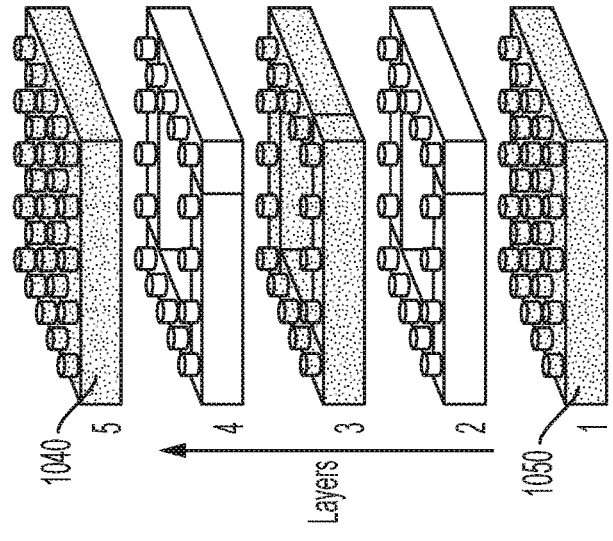

FIG. 10B illustrates an arrangement of the elementary units in the anisotropic cube actuator in accordance with some embodiments. In this case, a single layer of elementary units includes only a single type of elementary unit. For example, the layer 2 of the actuator solely comprises a soft elementary unit 1010, the layer 3 of the actuator solely comprises a stiffer elementary unit 1020, and the top layer 1040 and the bottom layer 1050 comprises a stiffer elementary unit 1030. Therefore, upon pressurization, the layers comprising the soft elementary units 1010 will expand more than the other layers comprising the stiffer elementary units 1020, thereby providing an anisotropic expansion. Similarly, upon deflation, the layers comprising the soft elementary units 1010 will deflate more than the other layers comprising the stiffer elementary units 1020, thereby providing an anisotropic deflation.

FIGS. 10C-10E show a shape of the anisotropic cube actuator at its resting state, in a pressurized state, and in a depressurized state, respectively. At its resting state, the anisotropic cube actuator is shaped as a cube, i.e., in accordance with FIG. 10B. Pressurized or depressurized fluid can be provided to the cube's cavity via a fluid inlet 1060. As illustrated in FIG. 10D, the cube actuator can inflate when the void space is pressurized via the fluid inlet 1060, and, as illustrated in FIG. 10E, the cube actuator can deflate when the void space is depressurized (i.e., negatively pressurized) via the fluid inlet 1060. Because of the difference in relative stiffness, the sides comprising a soft elementary unit can expand or deflate more than the sides comprising a strain-limiting elementary unit, thereby providing an anisotropic expansion or deflation.

The list of materials that can be used to build elementary units is extensive and encompasses elastomers such as latex, urethanes, polyurethanes, silicones, vulcanized or cross-linked rubber, fabrics such as paper, Kevlar©, cotton, nylon, carbon. An exemplary list of material combinations is shown in Table 1. Each combination provides for a varying degree of bending upon actuation, where the bending degree for the same channel material increases, e.g., greater deflection or smaller radius of curvature at the strain limiting layer, with increasing difference in elastic modulus of the strain limiter. Other materials and material combinations will be apparent to one of skill in the art.

| Soft elementary unit | | Strain limiting elementary unit | |
|---|---|---|---|
| Material | Young's Modulus (kPa) | Material | Young's Modulus |
| Ecoflex © silicone | ~40 | PDMS | ~400 kPa |
| Ecoflex © silicone | ~40 | Paper | >10 GPa |
| Ecoflex © silicone | ~40 | Plastic sheet | ~0.2 GPa for LDPE ~3 GPa for PET |
| Ecoflex © silicon | ~40 | Woven fiber mesh (fabric) | >70 GPa for Kevlar |
| PDMS | ~400 | Paper | >10GPa |

The choice of materials for the elementary units can determine a modular robot's response to pressure applied to the modular robot's internal channel. The pressure necessary to achieve a particular amplitude of actuation scales with the stiffness of the materials. Each combination provides a different behavior in bending, upon actuation: for the same channel geometry, the bending increases with increasing difference in elastic modulus between the elastomer and the strain limiting fabric (or layer). Effects of material choices is demonstrated with respect to two silicone elastomers (polydimethylsiloxane (PDMS, Dow Corning Sylgard 184) and Ecoflex 00-30 (a siloxane produced by Smooth-On; http://www.smooth-on.com)) because they are readily accessible, are easy to work with, bond well to each other to form multilayer structures, and are relatively inexpensive. However, other suitable material combinations will be readily apparent. PDMS is transparent and has a Shore A hardness of 50. It is elastic and can withstand repeated bending, but fractures above a maximum strain of 150%. As a result, PDMS has a limited range of deformation, and is suited for the more rigid parts of a structure—parts that bend but do not stretch. PDMS can be used as the flexible component, as noted in Table 1, in combination with stiffer materials such as paper. Ecoflex silicone is translucent and has a hardness below the Shore A scale. It fractures above a maximum strain of 900%; it is more flexible than PDMS, and therefore, it is suitable for components with larger strains/displacements (i.e., the layers of actuation). Because it is so soft, Ecoflex silicone, if unsupported, will bend under its own weight (PDMS, much less so). Composite structures, comprising layers of PDMS and Ecoflex silicone, balance the rigidity of PDMS with the flexibility of Ecoflex silicone for the desired function.

In other embodiments, the alternate materials are useful for the fabrication of elementary units. Composites using paper, textiles, carbon-, glass- or metal fiber as the stiffer material are possible. In other embodiments, stiffness is introduced into an elementary unit by introducing a reinforcing agent into the elementary unit. In other embodiments, an elementary unit can be chemically treated to increase its stiffness. By way of example, an elastomeric flexible polymer can be impregnated with a polymer precursor solution, which is then cured in a predetermined pattern to form a stiffer polymer.

FIGS. 11A-11G also illustrate that the direction and magnitude of expansion due to pressurization can be controlled by using elementary units having different strain characteristics. In this figure, a cube actuator is built using elementary units with lateral connectors, as disclosed with respect to FIG. 2 in accordance with some embodiments. In this example, the cube actuator includes six elementary units having single taper dovetail connectors. Each figure in FIG. 11 includes a schematic that illustrates the material used for each elementary unit (PDMS is hatched and Ecoflex is white.) The actuator under a negative pressure is shown in the left column of photographs and the actuator under positive pressure is shown in the right column of photographs. Each figure also shows photographs of the front of the actuator and of the side of the actuator at the bottom. For scale, the edges of the cubes are all 4.5 cm. Actuation was achieved using a positive pressure (relative to atmosphere) of ~1.5 psi or a negative pressure (relative to atmosphere) of ~−5 psi.

Figure 11G:
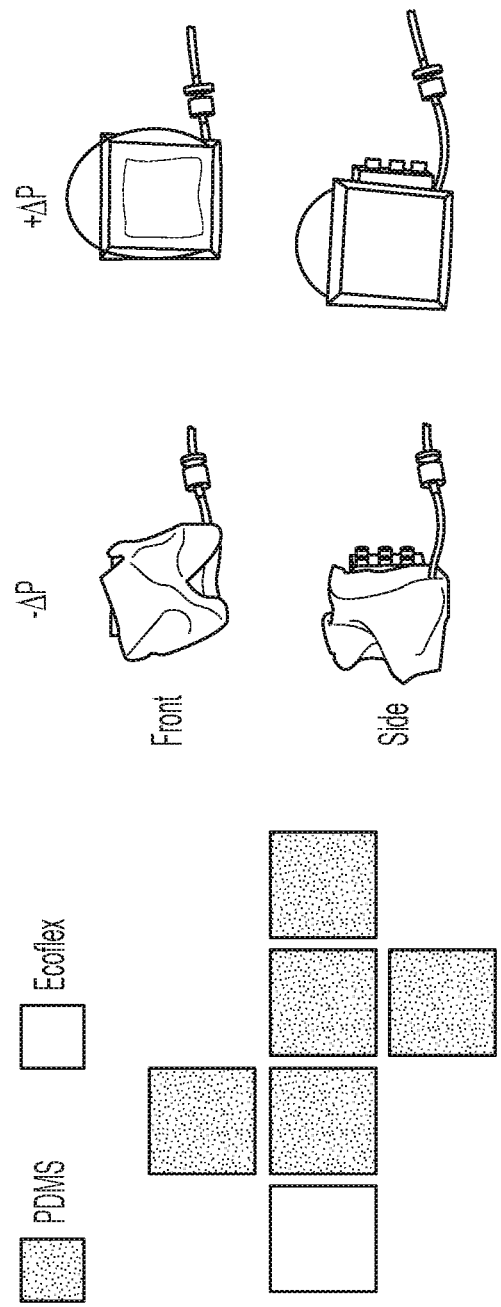

FIG. 11A shows that when all the elementary units are made of the same material (e.g., Ecoflex,) the expansion of the cube actuator is isotropic. However, FIGS. 11B-11G illustrate that the expansion of the cube actuator can be made anisotropic by modifying the material of the some elementary units. This illustrates that the shape of the pressurized or the depressurized actuators is a function of the type of material used for the elementary units.

The assembled actuators are not limited to rectangular shapes. In some embodiments, soft robots having arbitrary shapes can be assembled from rectangular elementary units. FIGS. 12A-12E illustrate a prism-like actuator assembled from rectangular elementary units in accordance with some embodiments. As illustrated in FIG. 12A, a prism-like actuator can be assembled from rectangular elementary units having 1×3, 1×4, 1×5, and 1×6 array of connectors. As illustrated in FIG. 12B, the elementary units can be assembled into layers, where each layer is a square with one side missing. As illustrated in FIG. 12C, the layers can be stacked to form a square cylinder 1210 with one side of the walls missing. Subsequently, as illustrated in FIG. 12D, the cylinder 1210 can be warped and sandwiched between two layers 1220, 1230, also formed using rectangular elementary units. This step can only be performed using soft elementary units because hard blocks cannot be warped to fit onto layers 1220, 1230 of a different shape. FIG. 12E illustrates the prism-like actuator's expansion characteristics upon pressurization.

In other embodiments, soft robots having arbitrary shapes can be assembled from elementary units having arbitrary shapes. FIGS. 13A-13D illustrate a process of building a cross-shaped actuator, assembled from cross-shaped elementary units, and its expansion characteristics in accordance with some embodiments. FIG. 13A show the elementary units used for the cross-shaped actuator. The cross-shaped actuator can include two layers 1210 having the desired shape (in this case, a cross-shape) and 24 rectangular elementary units 1220. As illustrated in FIG. 13B, the rectangular elementary units 1220 can be arranged to form layers 1230 having the desired shape, and as illustrated in FIG. 13C, the layers 1230 can be sandwiched between the top layer and the bottom layers 1240, thereby creating a cross-shaped actuator. FIG. 13D illustrates the cross-shaped actuator's expansion characteristics upon pressurization.

In some embodiments, one or more elementary units in arbitrary-shaped actuators can be made of stiffer materials, thereby controlling a direction of expansion or deflation upon pressurization or depressurization, respectively. For example, as illustrated in FIG. 13D, the cross-shaped actuator is configured to expand laterally upon pressurization, but is not configured to expand out to the top of the actuator or the bottom of the actuator because the top layer and the bottom layer are made of a stiffer material compared to the sides of the actuator.

Figure 14D:
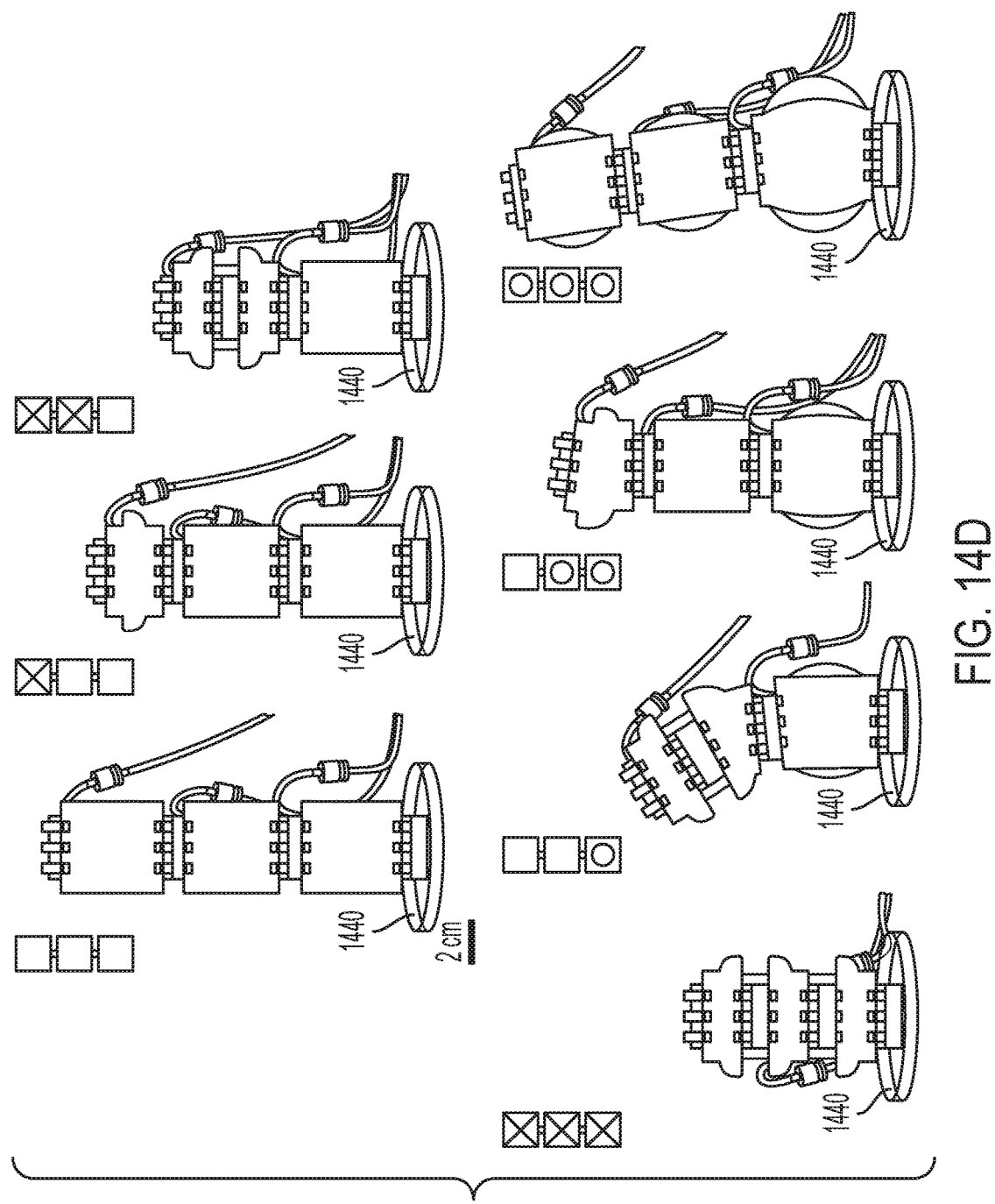

In some embodiments, multiple actuators can be connected to build a complex soft robot. FIGS. 14A-14E illustrate coupling two or more cube actuators using connectors in accordance with some embodiments. FIG. 14A illustrates two actuators 1410, 1420 to be coupled to each other. The two actuators 1410, 1420 have peg connectors that can couple to a recess connector 1430 located in between. The assembled system is illustrated in the left figure of FIG. 14C. These two actuators 1410, 1420 can be pressurized via a pneumatic line. The pneumatic line can include a Luer-Lok connector for providing pressure to the internal void region (i.e., a cavity) of the cube actuators 1410, 1420. The right figure of FIG. 14C illustrates the shape of the assembled soft robot when the actuators are pressurized. The pressurization state of the actuators 1410, 1420 can be illustrated using a notation in FIG. 14B. As illustrated in FIG. 14B, a square box indicates that the actuator is not pressurized; a crossed box indicates that the actuator is negatively pressurized; and a square box containing a circle indicates that the actuator is positively pressurized. In some embodiments, one or more actuators in the robot can be actuated simultaneously. In other embodiments, each actuator in the robot can be actuated independently. Thus, a robot that is capable of providing a complex motion can be easily prototyped by coupling several actuators formed using elementary units.

Figure 14E:
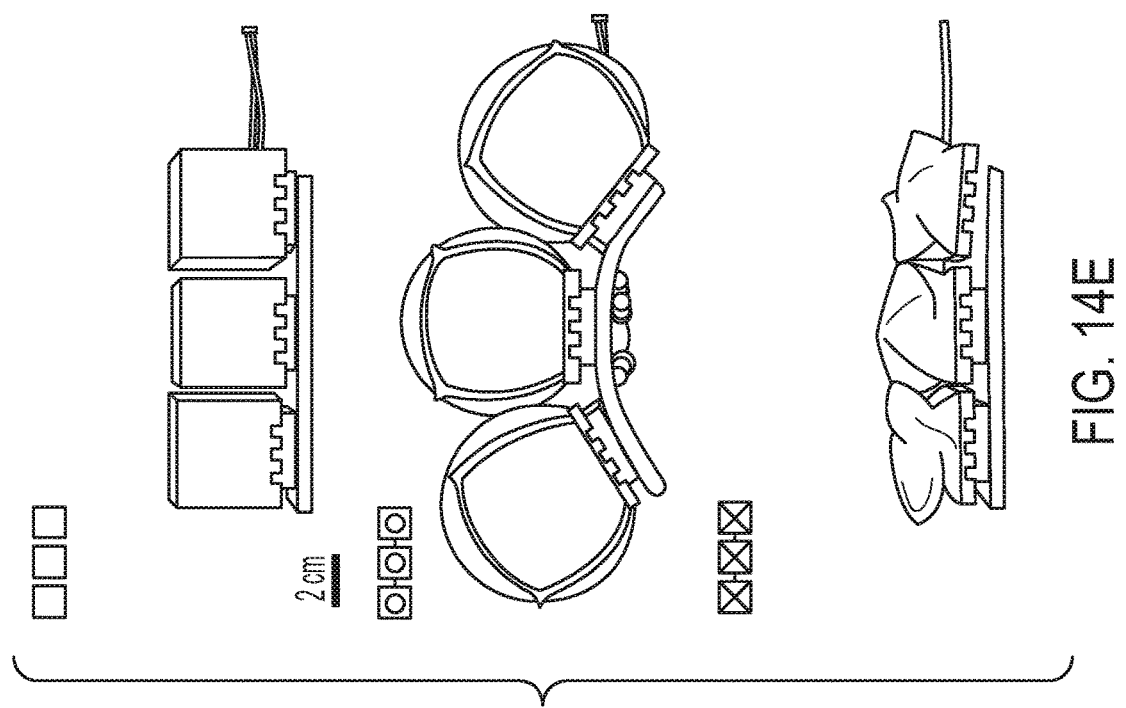

FIG. 14D illustrates a tower constructed from three actuators in accordance with some embodiments. Progressing from the left to right, top to bottom, the tower is collapsed using a negative pressure and expanded back to its full size using a positive pressure. The tower was anchored to a glass base 1440 using a mechanical connector, such as a peg/recess connector. FIG. 14E illustrates a line of three cube actuators whose bases are fixed together using connectors fabricated in PDMS, in accordance with some embodiments. Progressing from the top to bottom, the assembly is bent into an arch using a positive pressure applied to the actuators and is contracted back into a line using a negative pressure applied to the actuators.

In some embodiments, an elementary unit can include more than one material. FIGS. 15A-15E illustrate a cube actuator assembled using elementary units with more than one material in accordance with some embodiments. FIG. 15A illustrates a schematic of the cube, showing the elementary units for the cube. In some embodiments, the edge of the elementary units is formed using PDMS and the center of the elementary units is formed using Ecoflex. These elementary units can be assembled to form a cube actuator, as illustrated in FIGS. 15B-15C. FIGS. 15B-15C illustrate the perspective and side views of the actuator with no applied pressure. When the cube is actuated with a negative pressure, the shape of the cube changes accordingly, as illustrated in FIG. 15D. Because PDMS has a higher stiffness compared to Ecoflex, the Ecoflex portions are sucked into the cube while the PDMS portions stay intact. When the cube is actuated with a positive pressure, the shape of the cube changes differently, as illustrated in FIG. 15E. Because PDMS has a higher stiffness compared to Ecoflex, the Ecoflex portions are inflated out of the cubic structure while the PDMS portions stay intact.

Figure 16A:
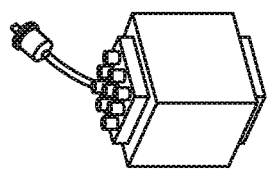
FIGS. 16A-16C illustrate a multi-functional soft robot in accordance with some embodiments.
Figure 16B:
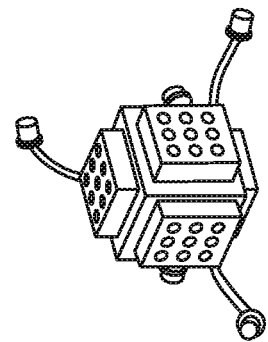
Figure 16C:
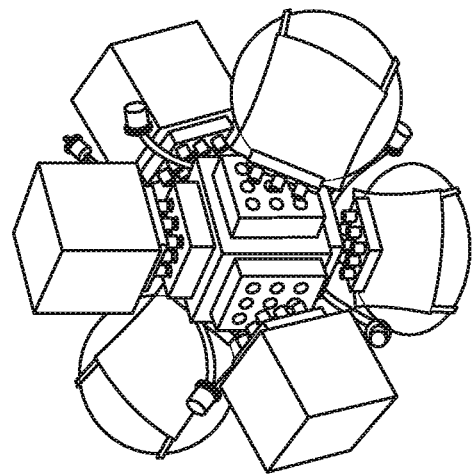

In some embodiments, the modular soft robots can include modules that are made of different materials. FIGS. 16A-16C illustrate a multi-functional soft robot in accordance with some embodiments. FIG. 16A shows the components of the multi-functional soft robot. The multi-functional soft robot can include a hub and actuators. The hub can be made of a rigid material, such as thermoplastic, whereas the actuators can be made of one or more soft materials, such as Ecoflex. FIG. 16B illustrates the fully assembled soft robot using the hub and the actuators. The fully assembled robot can be actuated by pressurizing one or more actuators, as illustrated in FIG. 16C. In some embodiments, the actuators can be coupled to the same pneumatic source; in other embodiments, the actuators can be coupled to separate, independent pneumatic sources.

Figure 17D:
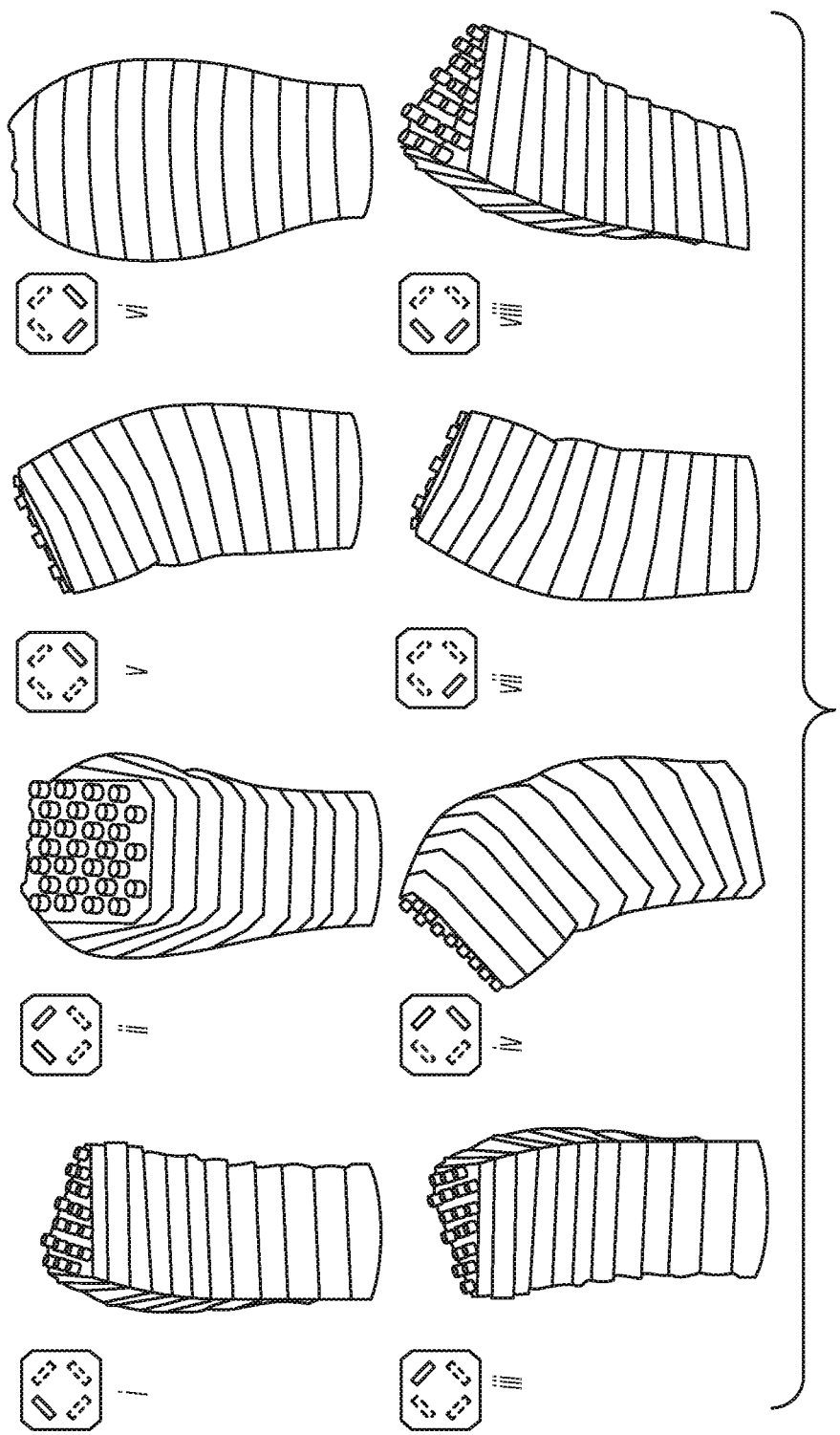

FIGS. 17A-17D illustrate a multi-channel actuator in accordance with some embodiments. FIG. 17A illustrates elementary units used in the multi-chamber actuator. As illustrated in FIGS. 17B-17C, two solid elementary units 1710 can form the top and bottom layer of the multi-chamber actuator, and these elementary units 1710 do not include any holes; the elementary units with holes 1720 can form intermediate layers. The holes 1730 in the intermediate layers 1720 can be aligned to form fluidic channels for actuation. In some embodiments, the solid elementary units 1710, forming the top layer and the bottom layer, can be made of a stiffer material compared to the elementary units with holes 1720 forming the intermediate layers.

FIG. 17D illustrates various actuation modes of the multi-chamber actuator. The block fluidic channels are pressurized; the white fluidic channels are not pressurized. One or more of the fluidic channels can be pressurized to bend the actuator in a predetermined direction and in a predetermined magnitude. For example, when the top-left fluidic channel is actuated, the actuator would bend toward the other side of the actuator (see, e.g., FIG. 17D-i.) As another example, when both of the top fluidic channels are actuated, then the actuator would bend downwards (see, e.g., top right figure of FIG. 17D-ii.)

In some embodiments, the fluidic channels in the multi-channel actuator can be positioned relative to one another so that the two of the fluidic channels are facing each other across the central axis of the actuator. Also, in some embodiments, the fluidic channels in the actuator can be equidistance from the central axis of the actuator. Such a configuration can allow the multi-channel actuator to operate as a roller.

Figure 18D:
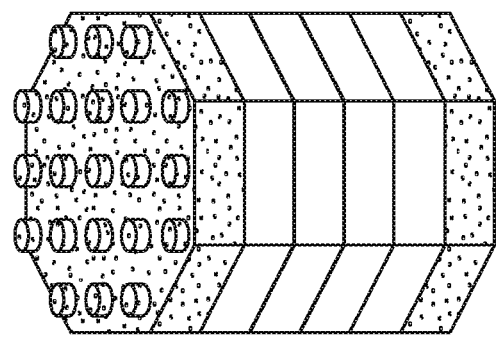
FIGS. 18A-18E illustrates the assembly of a rolling actuator and its operation in accordance with some embodiments.
Figure 18C:
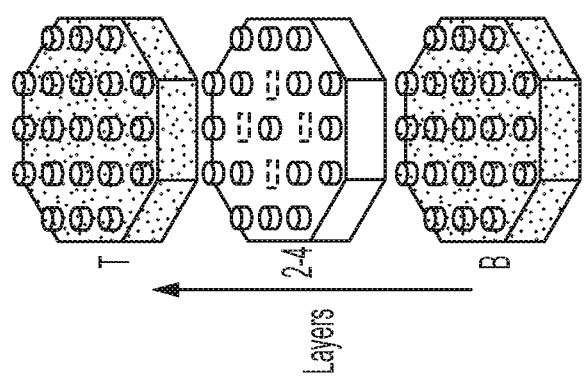
Figure 18A:
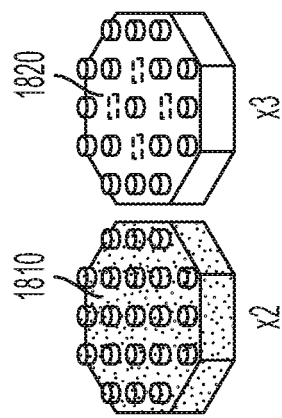
Figure 18B:
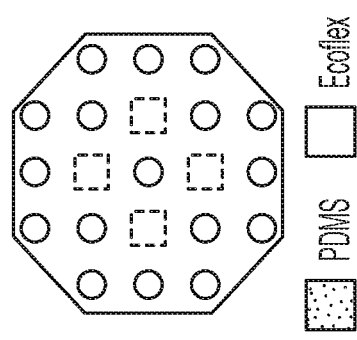

FIGS. 18A-18E illustrates the assembly of a rolling actuator and its operation in accordance with some embodiments. FIG. 18A shows that the rolling actuator can include two layers 1810 of a stiffer material, and three layers 1820 of a soft material. The three layer 1820 can include holes so that one or more fluidic channels can be formed by aligning the holes. The layers can be stacked, as illustrated in FIG. 18C, and create a rolling actuator as illustrated in FIG. 18D. Because the holes in the intermediate layers 1820 are aligned, the rolling actuator includes four fluidic channels.

Figure 18E:
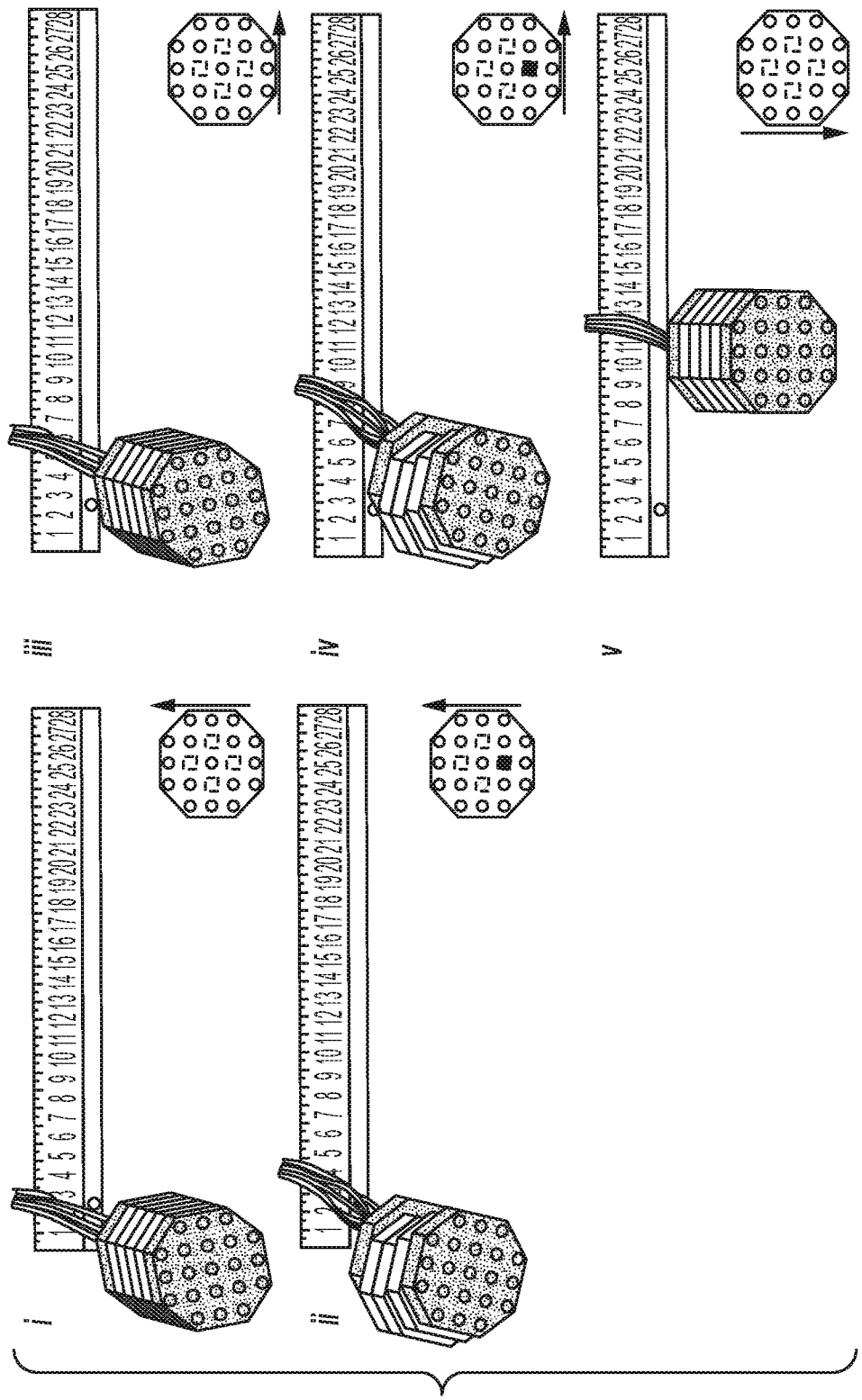

FIG. 18E illustrates a motion of a rolling actuator in accordance with some embodiments. By actuating one of the pneumatic channels, a portion of the actuator can be inflated against the ground surface, which in turn provides a rolling motion for the entire actuator. In some embodiments, two adjacent fluidic channels can be sequentially pressurized to improve the magnitude of the rolling motion.

As illustrated above, modular soft robots can enable an easy combination of elastomers with different stiffness. Using this capability, a variety of elastomeric structures with shape-changing characteristics can be created. These shape-changing characteristics can be difficult to realize using other techniques. Furthermore, the modular soft robots allow for creating a wide variety of shapes as the pressure level is varied from a rest state to a high-pressure state. Therefore, a single structure can enable a variety of geometries between a rest state and an inflated state, simply by controlling the pressure and controlling the materials used for the structure. This means that modular soft robots can be used as functional molds for manufacturing complex shapes. For example, by coating interior or exterior walls of these structures, in any desired pressure state, the complex shape of the modular soft robots can be replicated using hard materials, such as thermoplastic. This strategy could be useful in manufacturing plastic components or even novelty foods, like shaped chocolate.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, while the disclosed embodiments focused on macro-scale modular soft robots, similar designs can be used for micro-scale robots. For instance, small elementary units can be used to build microfluidic devices.

We claim:

1. A soft robotic actuator comprising:
   a plurality of molded flexible units, wherein each molded flexible unit comprises a mechanical connector configured to couple to another molded flexible unit, wherein each of the molded flexible units is solid, and the plurality of coupled molded flexible units are arranged to define a cavity;
   an inlet coupled to the cavity, wherein the inlet is configured to couple the cavity to a pressurized fluidic source or a depressurized fluidic source to inflate or deflate a portion of the soft robotic actuator;
   wherein the mechanical connector of each molded flexible unit comprises a male mechanical connector and a female mechanical connector, wherein the male mechanical connector of a first molded flexible unit is configured to couple to a female mechanical connector of a second molded flexible unit; and
   wherein the cavity is separate from the male mechanical connector and the female mechanical connector.

2. The soft robotic actuator of claim 1, wherein the male mechanical connector comprises a peg and the female mechanical connector comprises a recess.

3. The soft robotic actuator of claim 1, wherein the mechanical connector comprises a single taper dovetail joint configured to provide a resistance to a tensile strain along a single lateral direction.

4. The soft robotic actuator of claim 1, wherein the mechanical connector comprises a double taper dovetail joint configured to provide a resistance to a tensile strain along two directions.

5. The soft robotic actuator of claim 1, wherein one of the molded flexible units comprises a heterogeneous material, and further wherein the mechanical connector on the one of the molded flexible units is formed using a stiffer material compared to that of its body.

6. The soft robotic actuator of claim 1, wherein the plurality of molded flexible units is stacked on top of one another to form the soft robotic actuator.

7. The soft robotic actuator of claim 6, wherein each of the plurality of molded flexible units comprises a plurality of holes, and the plurality of holes are aligned to form a plurality of cavities.

8. The soft robotic actuator of claim 1, wherein some of the plurality of molded flexible units are arranged perpendicular to one another, thereby forming a cube actuator.

9. The soft robotic actuator of claim 1, wherein the mechanical connector is positioned along an edge of the molded flexible unit, and at least two of the molded flexible units are coupled to one another using the mechanical connector positioned along the edge of the molded flexible units.

10. The soft robotic actuator of claim 1, wherein one of the plurality of molded flexible units comprises a portion of a molded block that has been cut using a cutting tool.

11. The soft robotic actuator of claim 10, wherein the cutting tool comprises one of a razor blade, a knife, and scissors.

12. The soft robotic actuator of claim 1, wherein the plurality of molded flexible units comprises a first molded flexible unit and a second molded flexible unit, wherein the first molded flexible unit is less stiff as compared to the second molded flexible unit, and wherein upon pressurization or depressurization of the cavity, the first molded flexible unit is configured to expand more than the second molded flexible unit.

13. The soft robotic actuator of claim 12, wherein the first molded flexible unit and the second molded flexible unit comprise a sidewall of the cavity, thereby providing a control of a direction and magnitude of expansion upon pressurization or depressurization.

14. The soft robotic actuator of claim 12, wherein the first molded flexible unit is stacked on top of the second molded flexible unit, thereby providing a control of a location and magnitude of expansion along the cavity upon pressurization or depressurization.

15. The soft robotic actuator of claim 1, wherein one of the molded flexible unit has a square-shape.

16. The soft robotic actuator of claim 1, further comprising a glue between two molded flexible units for forming an air-tight coupling between the two molded flexible units.

17. The soft robotic actuator of claim 16, wherein the glue comprises a polydimethylsiloxane prepolymer.

18. The soft robotic actuator of claim 16, wherein the glue comprises a liquid Ecoflex prepolymer.

19. The soft robotic actuator of claim 1, wherein a portion of one of the molded flexible units comprises a stiff material that is configured not to inflate or deflate upon pressurization or depressurization.

20. A modular soft robot comprising:
a plurality of soft robotic actuators in accordance with claim 1; and
a fluidic inlet coupled to the inlets of the plurality of soft robotic actuators, wherein the fluidic inlet is configured to receive pressurized or depressurized fluid and to provide the received fluid to the inlets of the plurality of soft robotic actuators to inflate or deflate a portion of the plurality of soft robotic actuators.

21. A method of actuating a soft robotic actuator, the method comprising:
providing a soft robotic actuator in accordance with claim 1;
providing pressurized or depressurized fluid to the inlet of the soft robotic actuator to cause an expansion of a wall of the soft robotic actuator, thereby causing an actuation of the soft robotic actuator.

22. The soft robotic actuator of claim 1, wherein the male mechanical connector of a first molded flexible unit is configured to couple to a female mechanical connector of a second molded flexible unit to form air-tight connections.

23. The soft robotic actuator of claim 1, wherein the soft robotic actuator further comprises a top layer and a bottom layer; and the plurality of molded flexible units are sandwiched between the top of bottom layers.

* * * * *